United States Patent
Zhang et al.

(10) Patent No.: US 12,538,344 B2
(45) Date of Patent: Jan. 27, 2026

(54) WI-FI COMMUNICATION METHOD AND APPARATUS

(71) Applicant: Huawei Technologies Co., Ltd., Shenzhen (CN)

(72) Inventors: Yafan Zhang, Shanghai (CN); Yanjie Gu, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 885 days.

(21) Appl. No.: 17/488,974

(22) Filed: Sep. 29, 2021

(65) Prior Publication Data
US 2022/0022197 A1  Jan. 20, 2022

Related U.S. Application Data

(63) Continuation of application No. PCT/CN2019/080676, filed on Mar. 29, 2019.

(51) Int. Cl.
*H04W 4/00* (2018.01)
*H04W 24/02* (2009.01)
(Continued)

(52) U.S. Cl.
CPC ......... *H04W 72/542* (2023.01); *H04W 24/02* (2013.01); *H04W 48/16* (2013.01); *H04W 84/12* (2013.01)

(58) Field of Classification Search
CPC ........... H04J 2203/0069; H04W 72/04; H04W 72/50; H04W 72/542; H04W 24/02; H04W 24/10
See application file for complete search history.

(56) References Cited

U.S. PATENT DOCUMENTS 8,817,678 B2   8/2014   Moshfeghi
8,871,678 B2   10/2014  Ohse et al.
(Continued)

FOREIGN PATENT DOCUMENTS

CN   101873704 A   10/2010
CN   102523627 A   6/2012
(Continued)

OTHER PUBLICATIONS

"IEEE Standard for Information technology—Telecommunications and information exchange between systems Local and metropolitan area networks—Specific requirements—Part 11: Wireless LAN Medium Access Control (MAC) and Physical Layer (PHY) Specifications," IEEE 802.11, 2016, 3534 pages.

*Primary Examiner* — Shantell L Heiber
(74) *Attorney, Agent, or Firm* — Conley Rose, P.C.

(57) ABSTRACT

A WI-FI communication method is applied to a communication system including a first device and a second device, and the first device communicates with the second device using at least two configurable channel links. The method includes sending, by the first device, link indication information to the second device, where the link indication information is used to indicate link attributes of the at least two channel links, receiving, by the first device, a first configuration indication fed back by the second device in response to the link indication information, and configuring, by the first device, transmission modes of non-control frames on the at least two channel links based on the first configuration indication.

20 Claims, 15 Drawing Sheets

(51) Int. Cl.
*H04W 48/16* (2009.01)
*H04W 72/542* (2023.01)
*H04W 84/12* (2009.01)

(56) References Cited

U.S. PATENT DOCUMENTS

| | | | |
|---|---|---|---|
| 10,051,606 B1 * | 8/2018 | Nelson | H04W 72/02 |
| 10,638,491 B2 * | 4/2020 | Fujishiro | H04W 72/23 |
| 2002/0136268 A1 * | 9/2002 | Gan | H04W 72/542 |
| | | | 375/133 |
| 2008/0130573 A1 * | 6/2008 | Lee | H04W 16/10 |
| | | | 370/331 |
| 2009/0291644 A1 * | 11/2009 | Suwa | H04B 1/1027 |
| | | | 455/77 |
| 2012/0250631 A1 | 10/2012 | Jakola et al. | |
| 2014/0307593 A1 | 10/2014 | Zhao et al. | |
| 2018/0131476 A1 * | 5/2018 | Van Driest | H04L 27/2662 |
| 2018/0206143 A1 * | 7/2018 | Patil | H04L 45/245 |
| 2020/0329380 A1 * | 10/2020 | Persaud | H04W 4/021 |

FOREIGN PATENT DOCUMENTS

| | | |
|---|---|---|
| CN | 103002594 A | 3/2013 |
| CN | 106162891 A | 11/2016 |
| CN | 108650037 A | 10/2018 |
| EP | 2365725 A2 | 9/2011 |
| WO | 2017078465 A1 | 5/2017 |

* cited by examiner

| Stream identifier in old band (stream ID in old band) | | Stream identifier in new band (stream ID in new band) | | Stream identifier in new band valid (stream ID in new band valid) | Link loss countdown type (LLT type) | Reserved |
|---|---|---|---|---|---|---|
| Traffic identifier (TID) | Direction | Traffic identifier (TID) | Direction | | | |

WI-FI COMMUNICATION METHOD AND APPARATUS

CROSS-REFERENCE TO RELATED APPLICATIONS

This is a continuation of International Patent Application No. PCT/CN2019/080676 filed on Mar. 29, 2019, which is hereby incorporated by reference in its entirety.

TECHNICAL FIELD

This application relates to the field of communication technologies, and in particular, to a WI-FI communication method and apparatus.

BACKGROUND

In a WI-FI system, an access point (AP) and a station (STA) may perform data transmission on a plurality of channels. For example, in a communication system shown in FIG. 1, an AP and a STA may perform data transmission on two channel links (that is, a channel link 1 and a channel link 2). In an existing communication protocol, both the two channel links may be used for uplink data transmission or downlink data transmission. To be specific, the AP may send data on the two channel links, and the STA may also send data on the two channel links. Further, when the AP and the STA perform data transmission, both the AP and the STA preempt, through listening, a channel link in an idle state. For example, when the AP and the STA sense that the channel link 1 is in an idle state, the AP sends downlink data on the channel link 1, and the STA sends uplink data on the channel link 1. Consequently, the downlink data collides with the uplink data, that is, an air interface collision occurs. In this case, the downlink data and the uplink data need to be retransmitted, causing a relatively large data transmission delay.

SUMMARY

This application provides a WI-FI communication method and apparatus, to resolve a problem that a data transmission delay is relatively large because an AP and a STA preempt a channel link to transmit uplink and downlink data.

To achieve the foregoing objectives, the following technical solutions are used in this application.

According to a first aspect, a WI-FI communication method is provided, and applied to a communication system including a first device and a second device (where for example, the first device is an access point, and the second device is a station, or the first device is a station, and the second device is an access point). The first device communicates with the second device by using at least two configurable channel links, and the method includes sending, by the first device, link indication information to the second device, where the link indication information is used to indicate link attributes of the at least two channel links, receiving, by the first device, a first configuration indication fed back by the second device in response to the link indication information, and configuring, by the first device, transmission modes of non-control frames (where the non-control frames may include a data frame, an upper-layer service frame, some management frames, and the like) on the at least two channel links based on the first configuration indication, where the transmission modes include any one of the following an uplink transmission mode, a downlink transmission mode, or an uplink/downlink transmission mode.

In the foregoing technical solution, when the first device communicates with the second device by using the at least two configurable channel links, the first device and the second device configure the transmission modes of the non-control frames on the at least two channel links based on link attributes of different channel links, thereby avoiding a problem that an air interface collision occurs on uplink and downlink data because the communicating parties preempt a channel link, and further reducing a data transmission delay and improving channel link utilization.

In a possible implementation of the first aspect, sending, by the first device, link indication information to the second device includes sending, by the first device, the link indication information to the second device on any channel link in the at least two channel links by using a control frame, where the control frame includes any one of a beacon frame, a probe request frame, a probe response frame, an information frame, an association response frame, or an action frame. In the foregoing possible implementation, flexibility and diversity of manners of sending the link indication information by the first device to the second device can be improved.

In a possible implementation of the first aspect, the link attributes of the at least two channel links include at least one of a quantity of links of the at least two channel links, an identifier of each of the at least two channel links, expected transmission modes of the non-control frames on the at least two channel links, or supplementary information of the at least two channel links, where the supplementary information is used to separately indicate transmission capabilities of the at least two channel links. In the foregoing possible implementation, when selecting the transmission modes of the non-control frames based on the link attributes, the second device can make full use of link attributes of different channel links, thereby improving channel link utilization.

In a possible implementation of the first aspect, the supplementary information includes at least one of a throughput, a delay, throughput first, delay first, a busy/idle ratio of a channel on which a channel link is located, channel quality of service (QoS), a received signal strength indication (RSSI), a received signal-to-noise ratio (SNR), or a frame error rate (FER). In the foregoing possible implementation, efficiency of generating the first configuration indication by the second device can be improved, and utilization of the channel links can be improved.

In a possible implementation of the first aspect, the first configuration indication includes at least one of first information, second information, or third information, where the first information is used to indicate a channel link on which a transmission mode is to be configured as the uplink transmission mode, the second information is used to indicate a channel link on which a transmission mode is to be configured as the downlink transmission mode, and the third information is used to indicate a channel link on which a transmission mode is to be configured as the uplink/downlink transmission mode. In the foregoing possible implementation, flexibility and diversity of manners of configuring the at least two channel links by the first device can be improved.

In a possible implementation of the first aspect, the communication system further includes a controller, the at least two channel links include a first channel link and a second channel link, the first configuration indication includes the first information indicating the first channel link and the second information indicating the second channel link, and the configuring, by the first device, transmission modes of non-control frames on the at least two channel links based on the first configuration indication includes setting, by the first device, a transmission mode of a non-control frame on the first channel link as the uplink transmission mode based on the first information, and setting a transmission mode of a non-control frame on the second channel link as the downlink transmission mode based on the second information. Correspondingly, the method further includes receiving, by the first device on the first channel link, uplink data sent by the second device, and sending the uplink data to the controller, and receiving, by the first device, downlink data fed back by the controller in response to the uplink data, and sending the downlink data to the second device on the second channel link. In the foregoing possible implementation, a problem that an air interface collision occurs on uplink and downlink data because the communicating parties preempt a channel link can be avoided, and further, a data transmission delay is reduced and channel link utilization is improved.

In a possible implementation of the first aspect, the at least two channel links further include a third channel link, and the method further includes receiving, by the first device, a second configuration indication sent by the second device when determining that a channel link is faulty, where the second configuration indication is used to indicate to replace the faulty channel link with the third channel link, and the third channel link is a channel link that is not faulty, and setting, by the first device based on the second configuration indication, a transmission mode of a non-control frame on the third channel link to be consistent with a transmission mode of a non-control frame on the faulty channel link. To be specific, when the first channel link is faulty, the first device receives the second configuration indication that is sent by the second device and that indicates to replace the first channel link with the third channel link, and the first device sets the transmission mode of the non-control frame on the third channel link as the uplink transmission mode based on the second configuration indication. When the second channel link is faulty, the first device receives the second configuration indication that is sent by the second device and that indicates to replace the second channel link with the third channel link, and the first device sets the transmission mode of the non-control frame on the third channel link as the downlink transmission mode based on the second configuration indication. In the foregoing possible implementation, efficiency of recovering a channel link can be improved, to improve data transmission efficiency, and reduce a transmission delay.

In a possible implementation of the first aspect, the at least two channel links are different channel links in a same frequency band, or the at least two channel links are channel links in different frequency bands. In the foregoing possible implementation, diversity and flexibility of manners of configuring the at least two channel links can be improved.

According to a second aspect, a WI-FI communication method is provided, and applied to a communication system including a first device and a second device (where for example, the first device is an access point, and the second device is a station, or the first device is a station, and the second device is an access point). The first device communicates with the second device by using at least two configurable channel links, and the method includes receiving, by the second device, link indication information sent by the first device, where the link indication information is used to indicate link attributes of the at least two channel links, generating, by the second device, a first configuration indication based on the link indication information, where the first configuration indication is used to configure transmission modes of non-control frames on the at least two channel links, and the transmission modes include any one of an uplink transmission mode, a downlink transmission mode, or an uplink/downlink transmission mode, and sending, by the second device, the first configuration indication to the first device.

In the foregoing technical solution, when the first device communicates with the second device by using the at least two configurable channel links, the first device and the second device configure the transmission modes of the non-control frames on the at least two channel links based on link attributes of different channel links, thereby avoiding a problem that an air interface collision occurs on uplink and downlink data because the communicating parties preempt a channel link, and further reducing a data transmission delay and improving channel link utilization.

In a possible implementation of the second aspect, receiving, by the second device, link indication information sent by the first device includes receiving, by the second device, the link indication information sent by the first device on any channel link in the at least two channel links by using a control frame, where the control frame includes any one of a beacon frame, a probe request frame, a probe response frame, an information frame, an association response frame, or an action frame. In the foregoing possible implementation, flexibility and diversity of manners of sending the link indication information by the first device to the second device can be improved.

In a possible implementation of the second aspect, the link attributes of the at least two channel links include at least one of a quantity of links of the at least two channel links, an identifier of each of the at least two channel links, expected transmission modes of the non-control frames on the at least two channel links, or supplementary information of the at least two channel links, where the supplementary information is used to separately indicate transmission capabilities of the at least two channel links. In the foregoing possible implementation, when selecting the transmission modes of the non-control frames based on the link attributes, the second device can make full use of link attributes of different channel links, thereby improving channel link utilization.

In a possible implementation of the second aspect, the supplementary information includes at least one of a throughput, a delay, throughput first, delay first, a busy/idle ratio of a channel on which a channel link is located, channel QoS, an RSSI, a received SNR, or an FER. In the foregoing possible implementation, efficiency of generating the first configuration indication by the second device can be improved, and utilization of the channel links can be improved.

In a possible implementation of the second aspect, the first configuration indication includes at least one of first information, second information, or third information, where the first information is used to indicate a channel link on which a transmission mode is to be configured as the uplink transmission mode, the second information is used to indicate a channel link on which a transmission mode is to be configured as the downlink transmission mode, and the third information is used to indicate a channel link on which a transmission mode is to be configured as the uplink/downlink transmission mode. In the foregoing possible implementation, flexibility and diversity of manners of configuring the at least two channel links by the first device can be improved.

In a possible implementation of the second aspect, generating, by the second device, a first configuration indication based on the link indication information includes, if the link attributes of the at least two channel links meet service requirements of services carried on the at least two channel links, generating, by the second device, the first configuration indication that matches the link indication information, or skipping responding, by the second device, to the link indication information if the link attributes of the at least two channel links do not meet the service requirements. In the foregoing possible implementation, accuracy of generating the first configuration indication by the second device can be further improved, to accurately configure different channel links, and improve channel link utilization.

In a possible implementation of the second aspect, the at least two channel links include a first channel link and a second channel link, and the first configuration indication includes the first information indicating the first channel link and the second information indicating the second channel link. Optionally, configuring, by the second device, the transmission modes of the non-control frames on the at least two channel links based on the first configuration indication may include setting, by the second device, a transmission mode of a non-control frame on the first channel link as the uplink transmission mode based on the first information, and setting a transmission mode of a non-control frame on the second channel link as the downlink transmission mode based on the second information. In the foregoing possible implementation, a problem that an air interface collision occurs on uplink and downlink data because the communicating parties preempt a channel link can be avoided, and further, a data transmission delay is reduced and channel link utilization is improved.

In a possible implementation of the second aspect, when the at least two channel links include a first channel link and a second channel link, the first configuration indication further includes the first information indicating the first channel link and the second information indicating the second channel link, and the method further includes sending, by the second device, uplink data to the first device on the first channel link, and receiving, by the second device on the second channel link, downlink data fed back by the first device in response to the uplink data. In the foregoing possible implementation, a problem that an air interface collision occurs on uplink and downlink data because the communicating parties preempt a channel link can be avoided, and further, a data transmission delay is reduced and channel link utilization is improved.

In a possible implementation of the second aspect, the at least two channel links further include a third channel link, and the method further includes sending, by the second device, a second configuration indication to the first device when the second device determines that a channel link is faulty, where the second configuration indication is used to indicate to replace the faulty channel link with the third channel link, and the third channel link is a channel link that is not faulty. In the foregoing possible implementation, efficiency of recovering a channel link can be improved, to improve data transmission efficiency, and reduce a transmission delay.

In a possible implementation of the second aspect, the at least two channel links are different channel links in a same frequency band, or the at least two channel links are channel links in different frequency bands. In the foregoing possible implementation, diversity and flexibility of manners of configuring the at least two channel links can be improved.

According to a third aspect, a WI-FI communication apparatus is provided, where the apparatus communicates with a second device by using at least two configurable channel links, and the apparatus includes a sending unit, configured to send link indication information to the second device, where the link indication information is used to indicate link attributes of at least two channel links, a receiving unit, configured to receive a first configuration indication fed back by the second device in response to the link indication information, and a processing unit, configured to configure transmission modes of non-control frames on the at least two channel links based on the first configuration indication, where the transmission modes include any one of an uplink transmission mode, a downlink transmission mode, or an uplink/downlink transmission mode.

In a possible implementation of the third aspect, the sending unit is further configured to send the link indication information to the second device on any channel link in the at least two channel links by using a control frame, where the control frame includes any one of a beacon frame, a probe request frame, a probe response frame, an information frame, an association response frame, or an action frame.

In a possible implementation of the third aspect, the link attributes of the at least two channel links include at least one of a quantity of links of the at least two channel links, an identifier of each of the at least two channel links, expected transmission modes of the non-control frames on the at least two channel links, or supplementary information of the at least two channel links, where the supplementary information is used to separately indicate transmission capabilities of the at least two channel links.

In a possible implementation of the third aspect, the supplementary information includes at least one of a throughput, a delay, throughput first, delay first, a busy/idle ratio of a channel on which a channel link is located, channel QoS, an RSSI, a received SNR, or an FER.

In a possible implementation of the third aspect, the first configuration indication includes at least one of first information, second information, or third information, where the first information is used to indicate a channel link on which a transmission mode is to be configured as the uplink transmission mode, the second information is used to indicate a channel link on which a transmission mode is to be configured as the downlink transmission mode, and the third information is used to indicate a channel link on which a transmission mode is to be configured as the uplink/downlink transmission mode.

In a possible implementation of the third aspect, the at least two channel links include a first channel link and a second channel link, the first configuration indication includes the first information indicating the first channel link and the second information indicating the second channel link, and the processing unit is further configured to set a transmission mode of a non-control frame on the first channel link as the uplink transmission mode based on the first information, and set a transmission mode of a non-control frame on the second channel link as the downlink transmission mode based on the second information.

In a possible implementation of the third aspect, the receiving unit is further configured to receive, on the first channel link, uplink data sent by the second device, and the sending unit is further configured to send the uplink data to a controller, and the receiving unit is further configured to receive downlink data fed back by the controller in response to the uplink data, and the sending unit is further configured to send the downlink data to the second device on the second channel link.

In a possible implementation of the third aspect, the at least two channel links further include a third channel link, and the receiving unit is further configured to receive a second configuration indication sent by the second device when determining that a channel link is faulty, where the second configuration indication is used to indicate to replace the faulty channel link with the third channel link, and the third channel link is a channel link that is not faulty, and the processing unit is further configured to set, based on the second configuration indication, a transmission mode of a non-control frame on the third channel link to be consistent with a transmission mode of a non-control frame on the faulty channel link.

In a possible implementation of the third aspect, the at least two channel links are different channel links in a same frequency band, or the at least two channel links are channel links in different frequency bands.

According to a fourth aspect, a WI-FI communication apparatus is provided, where the apparatus communicates with a first device by using at least two configurable channel links, and the apparatus includes a receiving unit, configured to receive link indication information sent by the first device, where the link indication information is used to indicate link attributes of the at least two channel links, a processing unit, configured to generate a first configuration indication based on the link indication information, where the first configuration indication is used to configure transmission modes of non-control frames on the at least two channel links, and the transmission modes include any one of an uplink transmission mode, a downlink transmission mode, or an uplink/downlink transmission mode, and a sending unit, configured to send the first configuration indication to the first device.

In a possible implementation of the fourth aspect, the receiving unit is further configured to receive the link indication information sent by the first device on any channel link in the at least two channel links by using a control frame, where the control frame includes any one of a beacon frame, a probe request frame, a probe response frame, an information frame, an association response frame, or an action frame.

In a possible implementation of the fourth aspect, the link attributes of the at least two channel links include at least one of a quantity of links of the at least two channel links, an identifier of each of the at least two channel links, expected transmission modes of the non-control frames on the at least two channel links, or supplementary information of the at least two channel links, where the supplementary information is used to separately indicate transmission capabilities of the at least two channel links.

In a possible implementation of the fourth aspect, the supplementary information includes at least one of a throughput, a delay, throughput first, delay first, a busy/idle ratio of a channel on which a channel link is located, channel QoS, an RSSI, a received SNR, or an FER.

In a possible implementation of the fourth aspect, the first configuration indication includes at least one of first information, second information, or third information, where the first information is used to indicate a channel link on which a transmission mode is to be configured as the uplink transmission mode, the second information is used to indicate a channel link on which a transmission mode is to be configured as the downlink transmission mode, and the third information is used to indicate a channel link on which a transmission mode is to be configured as the uplink/downlink transmission mode.

In a possible implementation of the fourth aspect, the processing unit is further configured to, if the link attributes of the at least two channel links meet service requirements of services carried on the at least two channel links, generate the first configuration indication that matches the link indication information, or skip responding to the link indication information if the link attributes of the at least two channel links do not meet the service requirements.

In a possible implementation of the fourth aspect, the at least two channel links include a first channel link and a second channel link, the first configuration indication includes the first information indicating the first channel link and the second information indicating the second channel link. Optionally, the processing unit is further configured to set a transmission mode of a non-control frame on the first channel link as the uplink transmission mode based on the first information, and set a transmission mode of a non-control frame on the second channel link as the downlink transmission mode based on the second information.

In a possible implementation of the fourth aspect, the sending unit is further configured to send uplink data to the first device on the first channel link, and the receiving unit is further configured to receive, on the second channel link, downlink data fed back by the first device in response to the uplink data.

In a possible implementation of the fourth aspect, the at least two channel links further include a third channel link, and the sending unit is further configured to send a second configuration indication to the first device when the second device determines that a channel link is faulty, where the second configuration indication is used to indicate to replace the faulty channel link with the third channel link, and the third channel link is a channel link that is not faulty.

In a possible implementation of the fourth aspect, the at least two channel links are different channel links in a same frequency band, or the at least two channel links are channel links in different frequency bands.

According to a fifth aspect, a WI-FI communication apparatus is provided, where the apparatus includes a processor and a transceiver coupled to the processor, the apparatus separately establishes at least two channel links to communicate with a second device via the transceiver, and transmission modes of non-control frames on the at least two channel links are configurable. The processor is configured to send link indication information to the second device via the transceiver, where the link indication information is used to indicate link attributes of the at least two channel links. The processor is further configured to receive, via the transceiver, a first configuration indication fed back by the second device in response to the link indication information. The processor is further configured to configure the transmission modes of the non-control frames on the at least two channel links based on the first configuration indication, where the transmission modes include any one of an uplink transmission mode, a downlink transmission mode, or an uplink/downlink transmission mode.

In a possible implementation of the fifth aspect, the link indication information is carried by using a control frame, and the control frame includes any one of a beacon frame, a probe request frame, a probe response frame, an information frame, an association response frame, or an action frame.

In a possible implementation of the fifth aspect, the link attributes of the at least two channel links include at least one of the following information a quantity of links of the at least two channel links, an identifier of each of the at least two channel links, expected transmission modes of the non-control frames on the at least two channel links, or supplementary information of the at least two channel links, where the supplementary information is used to separately indicate transmission capabilities of the at least two channel links.

In a possible implementation of the fifth aspect, the supplementary information includes at least one of the following a throughput, a delay, throughput first, delay first, a busy/idle ratio of a channel on which a channel link is located, channel QoS, an RSSI, a received SNR, or a FER.

In a possible implementation of the fifth aspect, the first configuration indication includes at least one of first information, second information, or third information, where the first information is used to indicate a channel link on which a transmission mode is to be configured as the uplink transmission mode, the second information is used to indicate a channel link on which a transmission mode is to be configured as the downlink transmission mode, and the third information is used to indicate a channel link on which a transmission mode is to be configured as the uplink/downlink transmission mode.

In a possible implementation of the fifth aspect, when the at least two channel links include a first channel link and a second channel link, the first configuration indication further includes the first information indicating the first channel link and the second information indicating the second channel link, and the processor is further configured to set a transmission mode of a non-control frame on the first channel link as the uplink transmission mode based on the first information, and set a transmission mode of a non-control frame on the second channel link as the downlink transmission mode based on the second information.

In a possible implementation of the fifth aspect, the processor is further configured to receive, on the first channel link via the transceiver, uplink data sent by the second device, and send the uplink data to a controller, and receive downlink data fed back by the controller in response to the uplink data, and send the downlink data to the second device on the second channel link via the transceiver.

In a possible implementation of the fifth aspect, the at least two channel links further include a third channel link, and the processor is further configured to receive, via the transceiver, a second configuration indication sent by the second device when determining that a channel link is faulty, where the second configuration indication is used to indicate to replace the faulty channel link with the third channel link, and the third channel link is a channel link that is not faulty, and set, based on the second configuration indication, a transmission mode of a non-control frame on the third channel link to be consistent with a transmission mode of a non-control frame on the faulty channel link.

In a possible implementation of the fifth aspect, the at least two channel links are different channel links in a same frequency band, or the at least two channel links are channel links in different frequency bands.

According to a sixth aspect, a WI-FI communication apparatus is provided, where the apparatus includes a processor and a transceiver coupled to the processor, the apparatus separately establishes at least two channel links to communicate with a first device via the transceiver, and transmission modes of non-control frames on the at least two channel links are configurable. The processor is configured to receive, via the transceiver, link indication information sent by the first device, where the link indication information is used to indicate link attributes of the at least two channel links. The processor is further configured to generate a first configuration indication based on the link indication information, where the first configuration indication is used to configure the transmission modes of the non-control frames on the at least two channel links, and the transmission modes include any one of the following an uplink transmission mode, a downlink transmission mode, or an uplink/downlink transmission mode. The processor is further configured to send the first configuration indication to the first device via the transceiver.

In a possible implementation of the sixth aspect, the link indication information is carried by using a control frame, and the control frame includes any one of a beacon frame, a probe request frame, a probe response frame, an information frame, an association response frame, or an action frame.

In a possible implementation of the sixth aspect, the link attributes of the at least two channel links include at least one of a quantity of links of the at least two channel links, an identifier of each of the at least two channel links, expected transmission modes of the non-control frames on the at least two channel links, or supplementary information of the at least two channel links, where the supplementary information is used to separately indicate transmission capabilities of the at least two channel links.

In a possible implementation of the sixth aspect, the supplementary information includes at least one of a throughput, a delay, throughput first, delay first, a busy/idle ratio of a channel on which a channel link is located, channel QoS, a RSSI, a received SNR, or an FER.

In a possible implementation of the sixth aspect, the first configuration indication includes at least one of first information, second information, or third information, where the first information is used to indicate a channel link on which a transmission mode is to be configured as the uplink transmission mode, the second information is used to indicate a channel link on which a transmission mode is to be configured as the downlink transmission mode, and the third information is used to indicate a channel link on which a transmission mode is to be configured as the uplink/downlink transmission mode.

In a possible implementation of the sixth aspect, the processor is further configured to, if the link attributes of the at least two channel links meet service requirements of services carried on the at least two channel links, generate the first configuration indication that matches the link indication information, or skip responding to the link indication information if the link attributes of the at least two channel links do not meet the service requirements.

In a possible implementation of the sixth aspect, when the at least two channel links include a first channel link and a second channel link, the first configuration indication further includes the first information indicating the first channel link and the second information indicating the second channel link, and the processor is further configured to set a transmission mode of a non-control frame on the first channel link as the uplink transmission mode based on the first information, and set a transmission mode of a non-control frame on the second channel link as the downlink transmission mode based on the second information.

In a possible implementation of the sixth aspect, the processor is further configured to send uplink data to the first device on the first channel link via the transceiver, and receive, on the second channel link via the transceiver, downlink data fed back by the first device in response to the uplink data.

In a possible implementation of the sixth aspect, the at least two channel links further include a third channel link, and the processor is further configured to send, via the transceiver, a second configuration indication to the first device when determining that a channel link is faulty, where the second configuration indication is used to indicate to replace the faulty channel link with the third channel link, and the third channel link is a channel link that is not faulty.

In a possible implementation of the sixth aspect, the at least two channel links are different channel links in a same frequency band, or the at least two channel links are channel links in different frequency bands.

According to another aspect of this application, a communication system is provided. The communication system includes a first device and a second device, where the first device is the WI-FI communication apparatus provided in any one of the third aspect, the possible implementations of the third aspect, the fifth aspect, or the possible implementations of the fifth aspect, and the second device is the WI-FI communication apparatus provided in any one of the fourth aspect, the possible implementations of the fourth aspect, the sixth aspect, or the possible implementation of the sixth aspect.

According to another aspect of this application, a readable storage medium is provided. The readable storage medium is configured to store a computer program. When the computer program is run on a computer, the computer can perform the WI-FI communication method provided in any one of the first aspect or the possible implementations of the first aspect.

According to another aspect of this application, a readable storage medium is provided. The readable storage medium is configured to store a computer program. When the computer program is run on a computer, the computer can perform the WI-FI communication method provided in any one of the second aspect or the possible implementations of the second aspect.

According to another aspect of this application, a computer program product is provided. When the computer program product is run, a processor is enabled to perform the WI-FI communication method according to any one of the first aspect or the possible implementations of the first aspect.

According to another aspect of this application, a computer program product is provided. When the computer program product is run, a processor is enabled to perform the WI-FI communication method according to any one of the second aspect or the possible implementations of the second aspect.

It may be understood that any WI-FI communication apparatus, communication system, computer storage medium, or computer program product provided above is configured to perform the corresponding method provided above. Therefore, for beneficial effects of the apparatus, the communication system, the computer storage medium, or the computer program product, refer to the beneficial effects in the corresponding method provided above. Details are not described herein again.

DESCRIPTION OF EMBODIMENTS

Figure 1A:
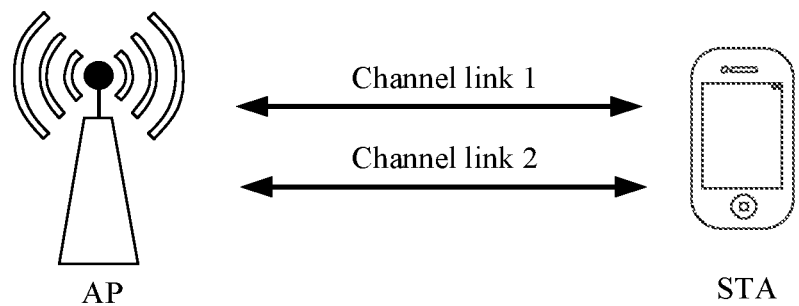
FIG. 1A is a schematic structural diagram of a WI-FI communication system according to an embodiment of this application.

In this application, "at least one" means one or more, and "a plurality of" means two or more. The term "and/or" describes an association relationship between associated objects and represents that three relationships may exist. For example, A and/or B may represent the following cases Only A exists, both A and B exist, and only B exists, where A and B may be singular or plural. "At least one item (piece) of the following" or a similar expression thereof means any combination of these items, including a singular item (piece) or any combination of plural items (pieces). For example, at least one of a, b, or c may represent a; b; c; a and b; a and c; b and c; or a, b, and c, where a, b, and c may be singular or plural. The character "/" usually indicates an "or" relationship between the associated objects. In addition, in the embodiments of this application, terms such as "first" and "second" do not limit a quantity or an execution sequence.

It should be noted that, in this application, the word "example" or "for example" is used to represent giving an example, an illustration, or a description. Any embodiment or design scheme described as an "example" or with "for example" in this application should not be explained as being more preferred or having more advantages than another embodiment or design scheme. Exactly, use of the word such as "example" or "for example" is intended to present a relative concept in a specific manner.

The method provided in the embodiments of this application is applicable to a WI-FI communication system, a BLUETOOTH communication system, a hybrid communication system in which WI-FI is combined with BLUETOOTH, a hybrid communication system in which a WI-FI technology is combined with visible light, or the like.

It should be noted that WI-FI is also referred to as "wireless hotspot", and is a wireless local area network technology based on the Institute of Electrical and Electronics Engineers (IEEE) 802.11 standard formulated by the WI-FI Alliance. The WI-FI Alliance was established in 1999, was named as Wireless Ethernet Compatibility Alliance (WECA) at that time, and was officially renamed as WI-FI Alliance in October 2002. The WI-FI devices are widely used in various electronic products, such as personal computers, game consoles, MPEG-1 Audio Layer III (MP3) players, smartphones, tablets, printers, laptops, and other peripheral devices that can access the Internet wirelessly. Correspondingly, as these electronic products continue to be updated, new requirements are put forward for performance of the WI-FI devices. In addition to supporting a throughput of 30 gigabits per second (Gbps), a delay and a jitter of WI-FI transmission need to be further improved.

Currently, the IEEE 802.11 standard working group has carried out formulation of a next-generation WI-FI standard, determined an extremely high throughput (EHT) as a specification in the next-generation WI-FI standard, and carried out corresponding research.

Based on this, the following describes a technical solution for reducing a delay provided in this application with reference to the accompanying drawings.

FIG. 1 is a schematic structural diagram of a WI-FI communication system according to an embodiment of this application. Referring to FIG. 1, the communication system includes an AP and an STA. The AP may provide a wireless WI-FI access service for the STA, to allow the STA to access, and provide data access. The AP may be a communication server, a router, a switch, a bridge, a computer, or the like. The STA may be a device, for example, a mobile phone, a tablet computer, an ultra-mobile personal computer (UMPC), a netbook, a wearable device (for example, a smart band or a smart watch), or a vehicle-mounted device. In this embodiment of this application, one STA may access one or more APs, or one or more STAs may access one AP, and one AP and one STA may perform data transmission by using a plurality of channel links.

For example, as shown in FIG. 1A, one AP and one STA perform data transmission by using a plurality of channel links. One AP may include a plurality of virtual access points (VAP), and the plurality of VAPs are controlled by one media access control (MAC) controller. One STA may include a plurality of virtual stations (VSTA), and the plurality of VSTAs are controlled by one MAC controller. One VAP and one VSTA correspond to one channel link. FIG. 1A shows, for description only, an example in which the plurality of VAPs include a VAP1 and a VAP2, the plurality of VSTAs include a VSTA1 and a VSTA2, the VAP1 and the VSTA1 correspond to a channel link 1, and the VAP2 and the VSTA2 correspond to a channel link 2.

Figure 1B:
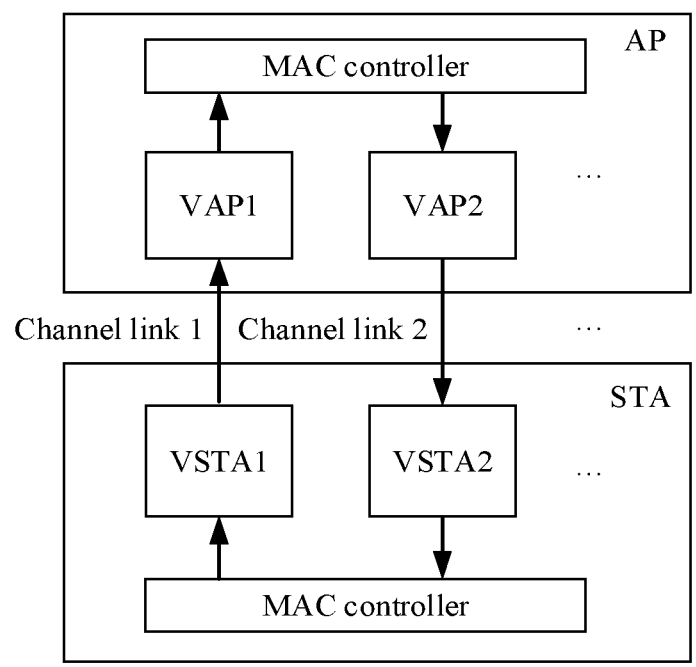
FIG. 1B is a schematic structural diagram of a WI-FI communication system according to an embodiment of this application.

Alternatively, as shown in FIG. 1B, one STA simultaneously accesses a plurality of APs, and the plurality of APs may be controlled by one AP controller (or a controller). One STA may include a plurality of VSTAs, the plurality of VSTAs are controlled by one MAC controller, and the plurality of VSTAs and the plurality of APs may correspond to a plurality of channel links. FIG. 1B shows, for description only, an example in which the plurality of VSTAs include a VSTA1 and a VSTA2, the plurality of APs includes an AP1 and an AP2, the AP1 and the VSTA1 correspond to a channel link 1, and the AP2 and the VSTA2 correspond to a channel link 2.

Figure 1C:
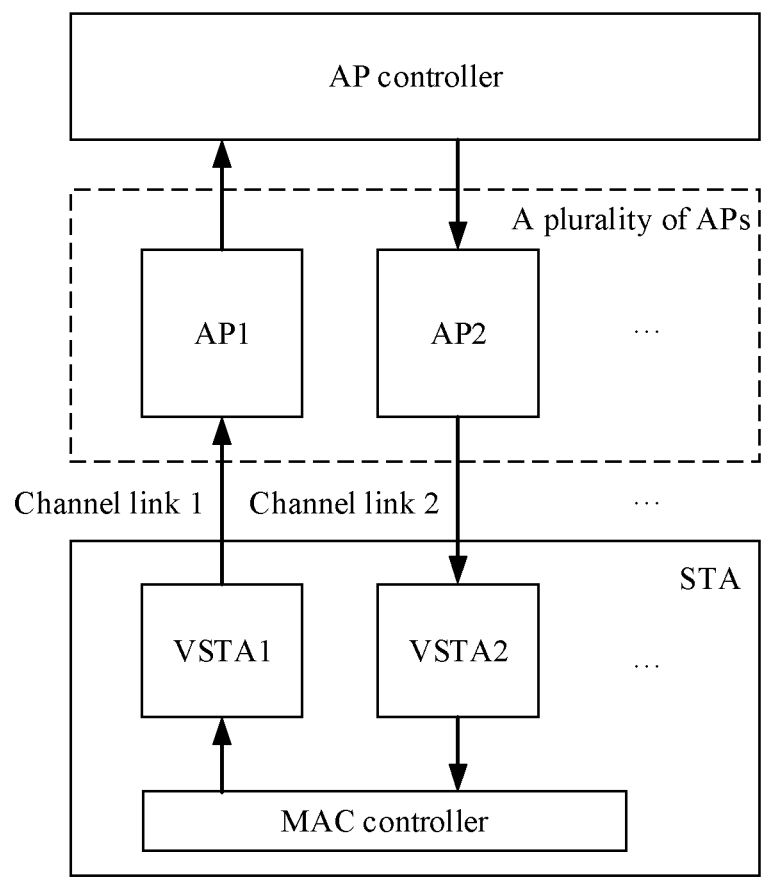
FIG. 1C is a schematic structural diagram of a WI-FI communication system according to an embodiment of this application.

Alternatively, as shown in FIG. 1C, each STA in a plurality of STAs simultaneously accesses a plurality of APs, each STA may include a plurality of VSTAs, the plurality of VSTAs in each STA are controlled by one MAC controller, and the plurality of APs may be controlled by one AP controller (or a controller). The plurality of VSTAs in each STA and the plurality of APs may correspond to a plurality of channel links, and manners of communication between the plurality of VSTAs in each STA and the plurality of APs by using the plurality of channel links may be similar. FIG. 1C shows, for description only, an example in which the plurality of STAs include a STA1 and a STA2, the STA1 includes a VSTA1 and a VSTA2, the STA2 includes a VSTA3 and a VSTA4, the plurality of APs include an AP1 and an AP2, the AP1 and the VSTA1 correspond to a channel link 1, the AP2 and the VSTA2 correspond to a channel link 2, the AP1 and the VSTA3 correspond to a channel link 3, and the AP2 and the VSTA4 correspond to a channel link 4.

Figure 1D:
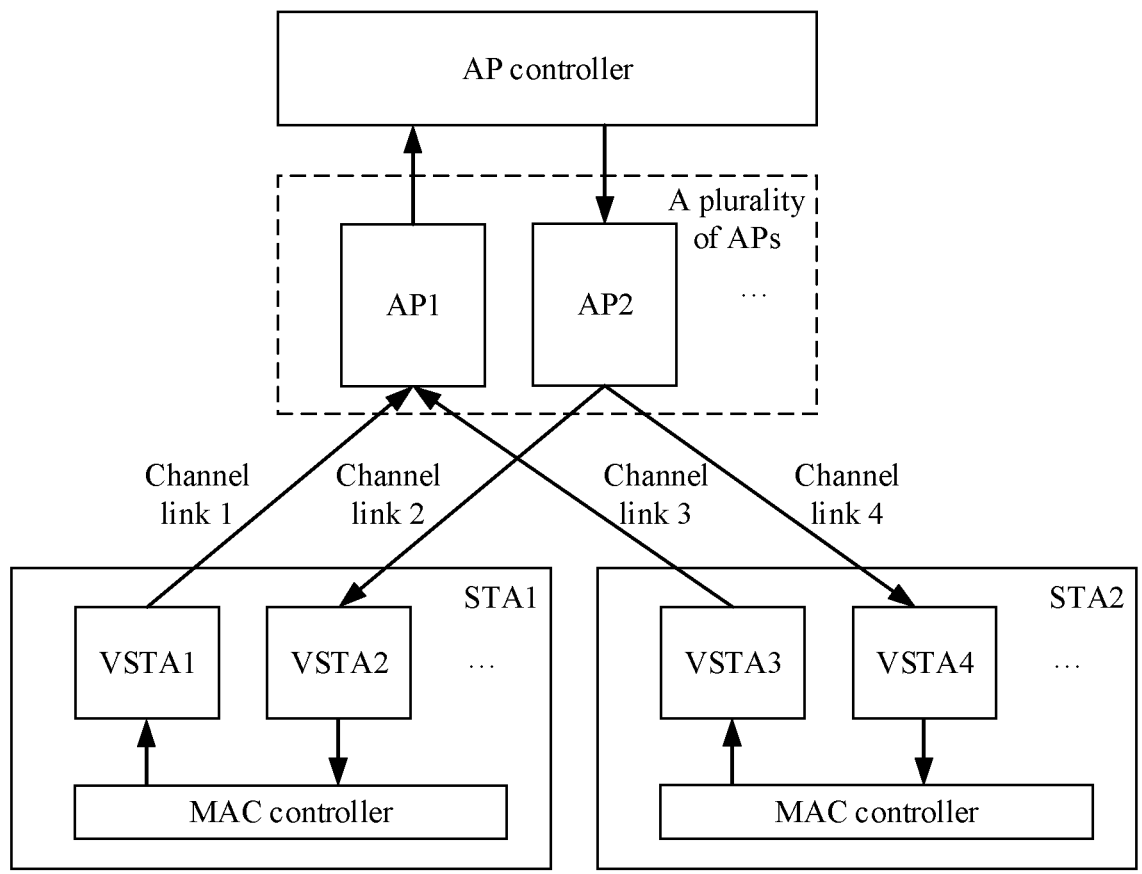
FIG. 1D is a schematic structural diagram of a WI-FI communication system according to an embodiment of this application.

Further, when one AP includes a plurality of VAPs, a structure of the AP may be shown in FIG. 1D. The AP includes a central processing unit (CPU) and a Peripheral Component Interconnect Express (PCIE) bus, a MAC controller, a MAC layer, a physical (PHY) layer, an analog baseband (ABB) module, and a radio frequency (RF) module. Similarly, when one STA includes a plurality of VSTAs, a structure of the STA may be shown in FIG. 1E. The STA includes a CPU, a MAC controller, a MAC layer, a PHY layer, an ABB module, and an RF module. It should be noted that in FIG. 1D, an example in which one AP includes two VAPs is used for description only, and in FIG. 1E, an example in which one STA includes two VSTAs is used for description only.

Figure 2:
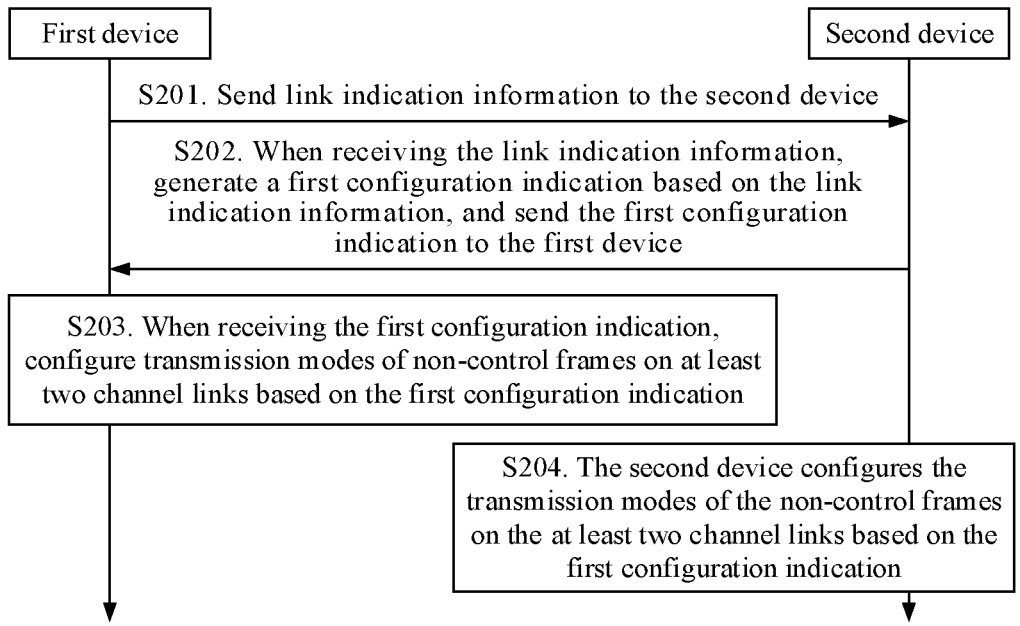
FIG. 2 is a schematic flowchart of a WI-FI communication method according to an embodiment of this application.

FIG. 2 is a schematic flowchart of a WI-FI communication method according to an embodiment of this application. The method may be applied to a communication system including a first device and a second device, and the first device communicates with the second device by using at least two configurable channel links. Referring to FIG. 2, the method includes the following steps.

S201. The first device sends link indication information to the second device, where the link indication information is used to indicate link attributes of the at least two channel links.

The communication system may be the WI-FI communication system shown in any one of FIG. 1 to FIG. 1C. The first device is an AP in the WI-FI system, and the second device is a STA in the WI-FI system. Alternatively, the first device is a STA in the WI-FI system, and the second device is an AP in the WI-FI system. This is not limited in this embodiment of this application.

In addition, the at least two channel links may be different channel links in a same frequency band, or channel links in different frequency bands. This is not limited in this embodiment of this application. For example, the at least two channel links include a first channel link and a second channel link, and the first channel link and the second channel link may be two different channel links in a fifth generation (5G) frequency band, or the first channel link is a channel link in a 5G frequency band, and the second channel link is a channel link in a sixth generation (6G) frequency band.

In addition, the link indication information is used to indicate the link attributes of the at least two channel links, where the link attributes of the at least two channel links may include at least one of a quantity of links of the at least two channel links, an identifier of each of the at least two channel links, expected transmission modes of non-control frames on the at least two channel links, or supplementary information of the at least two channel links, where the supplementary information is used to separately indicate transmission capabilities of the at least two channel links. The non-control frames may include a data frame, an upper-layer service frame, some management frames, and the like.

Optionally, the transmission modes may include any one of an uplink transmission mode, a downlink transmission mode, or an uplink/downlink transmission mode. That a transmission mode of a non-control frame on a channel link is an uplink transmission mode may mean that a transmission direction of the non-control frame on the channel link is uplink. For example, the channel link may be used to transmit uplink data, an uplink upper-layer service frame, and some uplink management frames. That a transmission mode of a non-control frame on a channel link is a downlink transmission mode may mean that a transmission direction of the non-control frame on the channel link is downlink. That a transmission mode of a non-control frame on a channel link is an uplink/downlink transmission mode may mean that a transmission direction of the non-control frame on the channel link may be uplink or downlink.

Optionally, the supplementary information may include at least one of the following a throughput, a delay, throughput first, delay first, a busy/idle ratio of a channel on which a channel link is located, channel QoS, an RSSI, a received SNR, or an FER. The throughput may include at least one of an actual throughput and a theoretical throughput. The delay may include at least one of an actual delay and a theoretical delay. That supplementary information of a channel link is throughput first may mean that the channel link may be preferably used to transmit data of a service with a relatively high throughput. That supplementary information of a channel link is delay first may mean that the channel link may be preferably used to transmit data of a service with a relatively low delay requirement.

The first device may directly obtain or obtain, through calculation, a throughput, a delay, an RSSI, a received SNR, a FER, and the like. For example, the first device may obtain a theoretical throughput of each channel link through theoretical calculation, for example, directly calculate a theoretical throughput by using a modulation and coding scheme (MCS) for a received frame of a current channel link, or deduce a theoretical throughput based on an RSSI, a received SNR, an FER, or the like for the received frame of the current channel link. Alternatively, the first device may measure an actual throughput by using a probing method, for example, obtain an actual throughput based on a historical statistical capability for a current channel link. The first device may further indirectly calculate a theoretical delay by using a transmit queue to which MAC belongs, a mechanism of a MAC interaction frame, and a PHY MCS, or obtain an actual delay of each channel link through measurement by sending and receiving a probe frame and based on a round-trip time difference of the probe frame.

Further, the first device may send the link indication information to the second device on any one of the at least two channel links, and the link indication information may be carried in a control frame. For example, the control frame may include a beacon frame, a probe request frame, a probe response frame, an information (association request) frame, an association response frame, or an action frame. For example, when the first device is a STA and the second device is an AP, the STA may send the link indication information to the AP by using a beacon frame, a probe request frame, an information frame, or an action frame. When the first device is an AP and the second device is a STA, the AP may send the link indication information to the STA by using a beacon frame, a probe response frame, an association response frame, or an action frame.

Figures 3, 4:
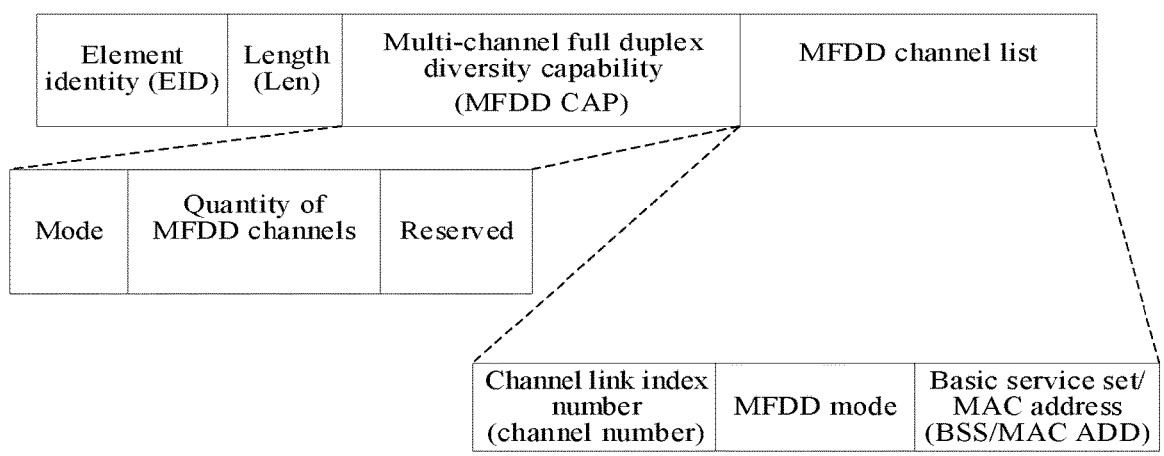
FIG. 3 is a schematic structural diagram of a control frame according to an embodiment of this application.
FIG. 4 is a schematic structural diagram of a control frame according to an embodiment of this application.

In a possible implementation, a structure of the control frame may be shown in FIG. 3, and includes an element identity (EID), a length (Len), a multi-channel full duplex diversity (MFDD) capability (CAP), and an MFDD channel list. EID is used to identify the control frame, and the EID may be a vendor ID or defined in a communication standard. Len is used to indicate a total length of the MFDD CAP and the MFDD channel list.

For example, in the control frame shown in FIG. 3, the MFDD CAP may further include a mode and a quantity of MFDD channels. The mode is used to indicate whether a current mode is an AP mode or a STA mode (that is, whether the first device is an AP or a STA), and the quantity of MFDD channels is used to indicate a quantity of channel links supported in the current mode. For example, a length of the mode is 1 bit, a value of the bit being 0 is used to indicate that the current mode is an AP mode, and in this case, the quantity of MFDD channels is used to indicate a quantity of channel links supported by an AP, the value of the bit being 1 is used to indicate the current mode is a STA mode, and in this case, the quantity of MFDD channels is used to indicate a quantity of channel links supported by a STA. In addition, the MFDD CAP may further include a reserved field. The reserved field may be used to carry other information related to the MFDD CAP, and the like. This is not limited in this embodiment of this application.

For example, in the control frame shown in FIG. 3, the MFDD channel list may further include a channel link index number, an MFDD mode, and a basic service set (BSS)/MAC address (ADD). The channel link index number may also be referred to as a channel link identifier. The MFDD mode may include a transmission mode and/or supplementary information of a non-control frame on a channel link. For example, a length of the MFDD mode may be 1 byte. Different values of the least significant 4 bits (that is, the last four bits) of the byte are used to indicate different transmission modes, and different values of the most significant 4 bits (that is, the first four bits) of the byte are used to indicate different supplementary information. Specific descriptions may be shown in the following Table 1.

TABLE 1

| Value | MFDD mode |
| --- | --- |
| Least significant 4 bits = 1 | Uplink transmission mode |
| Least significant 4 bits = 2 | Downlink transmission mode |
| Least significant 4 bits = 3 | Uplink/Downlink transmission mode |
| Most significant 4 bits = 1 | Throughput first |
| Most significant 4 bits = 2 | Delay first |
| Other | Reserved |

It should be noted that specific definitions of the MFDD mode shown in Table 1 are merely examples, and do not constitute a limitation on this embodiment of this application.

For example, a definition of the BSS/MAC ADD in the MFDD channel list may be When the mode in the control frame shown in FIG. 3 is an AP mode, the BSS/MAC ADD may be used to indicate a BSS identifier (BSSID) of an AP, when the mode in the control frame shown in FIG. 3 is a STA mode, the BSS/MAC ADD may be used to indicate a MAC address of a STA.

It should be noted that the link indication information sent by the first device to the second device may include all information in the descriptions of the structure of the control frame shown in FIG. 3, or may include only some information in the descriptions of the structure of the control frame. This is not limited in this embodiment of this application.

In another possible implementation, a structure of the control frame may be shown in FIG. 4, and includes a stream identifier in old band (stream ID in old band), a stream identifier in new band (stream ID in new band), a stream identifier in new band valid (stream ID in new band valid), a link loss countdown type (LLT type), and a reserved field. Both the stream identifier in old band and the stream identifier in new band may include a traffic identifier (TID) and a direction, where the direction may be used to indicate a transmission mode and/or supplementary information of a non-control frame on a channel link.

It should be noted that the structure of the control frame shown in FIG. 4 may be a part of a fast session transfer (FST) frame. For example, a switching parameters field in the FST frame is extended, further, a length of the direction may be extended, to obtain the control frame. For details about related content and descriptions of each field in FIG. 4, refer to related descriptions of an FST frame in the conventional technology. This is not described in this embodiment of this application.

For example, in the control frame shown in FIG. 4, a length of the direction may be 2 bits, and specific definitions may be shown in the following Table 2. Alternatively, a length of the direction may be 3 bits or greater than 3 bits. When the length is 3 bits, specific definitions may be shown in the following Table 3.

TABLE 2

| Value of 2 bits | Direction |
| --- | --- |
| 00 | Uplink transmission mode |
| 01 | Downlink transmission mode |
| 10 | Uplink/Downlink transmission mode |
| 11 | Reserved |

TABLE 3

| Value of 3 bits | Direction |
| --- | --- |
| X00 | Uplink transmission mode |
| X01 | Downlink transmission mode |
| X10 | Uplink/Downlink transmission mode |
| X11 | Reserved |
| 0XX | Throughput first |
| 1XX | Delay first |

It should be noted that specific definitions of the direction shown in Table 2 and Table 3 are merely examples, and do not constitute a limitation on this embodiment of this application. In an actual application, one or more bits may be extended in another field to play a same function. For example, one or more bits are extended in the reserved field shown in FIG. 4.

Further, the first device may obtain the link attribute of each channel link included in the link indication information by using the following method. The first device obtains a service characteristic of a service carried on the first device, obtains a transmission capability of each channel link, and based on the service characteristic and the transmission capability of each channel link, determines the link attribute of each channel link (that is, determines a manner of allocating the at least two channel links).

For example, it is assumed that the first device is a STA. When a service carried on the STA is a service of uploading backup data to cloud, it may be determined that data of the service is uplink data and a relatively high throughput is required. When the service carried on the STA is a movie watching service, it may be determined that the data of the service is downlink data and a relatively high throughput is required. When the service carried on the STA is a video call service, it may be determined that the data of the service includes uplink data and downlink data and a relatively high throughput is required. When the service carried on the STA is a real-time battle game service, it may be determined that the data of the service includes uplink data and downlink data and a relatively low delay is required. In addition, the STA may further directly obtain a theoretical throughput of each channel link through theoretical calculation, for example, directly calculate a theoretical throughput by using an MCS for a received frame of a current channel link, or deduce a theoretical throughput based on an RSSI, a received SNR, an FER for the received frame of the current channel link. Alternatively, the STA may measure an actual throughput by using a probing method, for example, obtain an actual throughput based on a historical statistical capability for a current channel link. The STA may further indirectly calculate a theoretical delay by using a transmit queue to which MAC belongs, a mechanism of a MAC interaction frame, and a PHY MCS, or obtain an actual delay of each channel link through measurement by sending and receiving a probe frame and based on a round-trip time difference of the probe frame. Then, the STA may determine the link attribute of each channel link based on the service characteristic of each service and the transmission capability of each channel link. For example, the service characteristic is downlink data and a relatively high throughput is required. If it is determined that a theoretical throughput or an actual throughput of a channel link is relatively high, a transmission mode of a non-control frame on the channel link may be determined as the downlink transmission mode, and the supplementary information of the channel link may be determined as throughput first.

It should be noted that when the first device is an AP, the AP may also determine the link attribute of each channel link by using the foregoing similar method. Details are not described herein again in this embodiment of this application.

S202. When the second device receives the link indication information, the second device generates a first configuration indication based on the link indication information, and sends the first configuration indication to the first device. The first configuration indication is used to configure transmission modes of non-control frames on the at least two channel links, and the transmission modes include any one of an uplink transmission mode, a downlink transmission mode, or an uplink/downlink transmission mode.

The first configuration indication may include at least one of first information, second information, or third information, where the first information is used to indicate a channel link on which a transmission mode is to be configured as the uplink transmission mode, the second information is used to indicate a channel link on which a transmission mode is to be configured as the downlink transmission mode, and the third information is used to indicate a channel link on which a transmission mode is to be configured as the uplink/downlink transmission mode.

That the second device generates a first configuration indication based on the link indication information may further include, if the link attributes of the at least two channel links meet service requirements of services carried on the at least two channel links, the second device generates the first configuration indication that matches the link indication information, or the second device skips responding to the link indication information if the link attributes of the at least two channel links do not meet the service requirements.

Optionally, the service requirement may include user configuration, a priority and a data amount of a to-be-carried service, a capability and an environment of a channel link, and the like. A specific process may be described below.

For example, the service requirement is determined based on the priority of the to-be-carried service. For example, it is identified, based on a protocol identification database (including but not limited to an application ID, an application name, and a service type) that a user is watching a 3D interactive movie by using a STA terminal. Both uplink and downlink data corresponding to the application ID have strict requirements on a transmission delay of a data service. It may be considered that service data corresponding to the application ID has a high priority, and an overall throughput needs to be sacrificed to ensure a delay. If a delay of a channel link in the link indication information meets a requirement, the channel link may be allocated for the service.

For example, the service requirement is determined based on the data amount of the to-be-carried service. For example, downlink service traffic and uplink service traffic of a service are obtained based on historical information, and a channel link matching the downlink service traffic and the uplink service traffic is selected based on the link attributes of the at least two channel links to transmit corresponding service traffic. If there are two or more applications (with different application IDs), the applications may be prioritized, and weight coefficients of the downlink service traffic and the uplink service traffic are allocated based on priorities. Then, a channel link that matches service traffic obtained by multiplying the corresponding service traffic by a respective weight coefficient is selected based on the link attributes of the at least two channel links, to transmit the corresponding service traffic.

For example, the service requirement is determined based on the channel capability. For example, maximum throughputs of different channel links are calculated based on an MCS table locally stored by the AP or the STA. For example, a maximum throughput of the first channel link is 65 megabits per second (Mbps), and a maximum throughput of the second channel link is 433 Mbps. Then, a channel link with a relatively high maximum throughput is selected from the at least two links based on the link attributes of the at least two channel links, to transmit data with a relatively high throughput.

For example, the service requirement is determined based on the channel environment. For example, information such as an RSSI, an SNR, and a PER is obtained by using a conventional measurement method, or an RTT is directly obtained through measurement by sending a probe frame, and a better channel link in the at least two channel links is selected based on these parameters, to transmit data. The PER is used as an example. Assuming that an uplink PER of the first channel link is 10%, a downlink PER of the first channel link is 15%, an uplink PER of the second channel link is 20%, and a downlink PER of the second channel link is 25%, actual throughput capabilities can be deduced based on the information. The actual throughput capabilities may also be obtained through table query or conversion based on other channel information such as RSSIs and SNRs.

For example, the manner of allocating the channel links is determined based on a bearer capability. For example, an uplink bearer capability of the second channel link is far greater than an uplink bearer capability of the first channel link and is greater than a required uplink throughput, and a downlink bearer capability of the second channel link is far greater than a downlink bearer capability of the first channel link and is greater than a required downlink throughput. In this case, the following two allocation manners may be determined: Allocation manner 1: A transmission mode of a non-control frame on the first channel link is the downlink transmission mode and a transmission mode of a non-control frame on the second channel link is the uplink transmission mode. Allocation manner 2: A transmission mode of a non-control frame on the first channel link is the uplink transmission mode and a transmission mode of a non-control frame on the second channel link is the downlink transmission mode.

Further, a final channel link allocation manner is determined based on an RTT or a channel capability. For example, if an RTT in the allocation manner 1 is greater than an RTT in the allocation manner 2, the allocation manner 2 may be selected as a final allocation manner. If RTTs in the two allocation manners are the same, there is no RTT, or the RTTs are inaccurate, the allocation manner 1 or the allocation manner 2 may be selected as the final allocation manner by default. In addition, when a downlink throughput required by downlink data is far greater than a downlink throughput required by uplink data, it is determined that the throughput required by the downlink data is higher, and therefore the allocation manner 2 is selected as the final allocation manner.

Further, for a complex scenario, determining may be directly performed based on an RTT, or may be performed based on a plurality of parameters such as an RTT, a channel capability, and a required throughput, for example, performed based on correlation, a variance, and the like of the plurality of parameters.

After the second device generates the first configuration indication, the second device may send the first configuration indication on any one or more of the at least two channel links. For example, if the first configuration indication includes first information and second information, the second device may send the first information and the second information to the first device on a same channel link, or may send the first information and the second information to the first device on different channel links. For example, the second device sends the first information and the second information to the first device on the first channel link. Alternatively, the second device sends the first information to the first device on the first channel link, and sends the second information to the first device on the second channel link.

S203. When the first device receives the first configuration indication sent by the second device, the first device configures the transmission modes of the non-control frames on the at least two channel links based on the first configuration indication.

Further, the first device may include a first access point and a second access point, the second device includes a first station and a second station, the first channel link may be a channel link between the first access point and the first station, and the second channel link may be a channel link between the second access point and the second station.

In this case, when the first configuration indication includes the first information used to indicate the first channel link and the second information used to indicate the second channel link, that the first device configures the transmission modes of the non-control frames on the at least two channel links based on the first configuration indication may include, the first device sets the transmission mode of the non-control frame on the first channel link as the uplink transmission mode based on the first information, and sets the transmission mode of the non-control frame on the second channel link as the downlink transmission mode based on the second information.

Further, when the first information is used to indicate the first channel link and the throughput is first considered, the first device may set the transmission mode of the non-control frame on the first channel link as the uplink transmission mode in which the throughput is first considered. When the second information is used to indicate the second channel link and the delay is first considered, the first device may set the transmission mode of the non-control frame on the second channel link as the downlink transmission mode in which the delay is first considered.

S204. The second device configures the transmission modes of the non-control frames on the at least two channel links based on the first configuration indication. S204 and S203 may be performed in any sequence. In FIG. 2, an example in which S204 is after S203 is used for description.

When the first configuration indication includes at least one of the first information, the second information, or third information, the second device may set, based on a channel link indicated by the at least one piece of information, a transmission mode of a non-control frame on the indicated channel link as a corresponding transmission mode.

For example, when the first configuration indication includes the first information used to indicate the first channel link and the second information used to indicate the second channel link, that the second device configures the transmission modes of the non-control frames on the at least two channel links based on the first configuration indication may also include, the second device sets the transmission mode of the non-control frame on the first channel link as the uplink transmission mode based on the first information, and sets the transmission mode of the non-control frame on the second channel link as the downlink transmission mode based on the second information. Further, when the first information is used to indicate the first channel link and the throughput is first considered, the second device may set the transmission mode of the non-control frame on the first channel link as the uplink transmission mode in which the throughput is first considered. When the second information is used to indicate the second channel link and the delay is first considered, the second device may set the transmission mode of the non-control frame on the second channel link as the downlink transmission mode in which the delay is first considered.

After both the first device and the second device set the transmission mode of the non-control frame on the first channel link as the uplink transmission mode, and set the transmission mode of the non-control frame on the second channel link as the downlink transmission mode, the first device and the second device may perform data transmission on the first channel link and the second channel link. For example, if the first device is an AP and the second device is a STA, the AP may send downlink data on the second channel link, and the STA may send uplink data on the first channel link.

Further, the first device further includes a third access point, the second device further includes a third station, and a third channel link exists between the third access point and the third station, that is, the at least two channel links further include the third channel link. The first configuration indication may further include information used to indicate a transmission mode that is of a non-control frame and that needs to be configured on the third channel link. The transmission mode that is of the non-control frame and that needs to be configured on the third channel link may be any one of the uplink transmission mode, the downlink transmission mode, or the uplink/downlink transmission mode.

Figure 5:
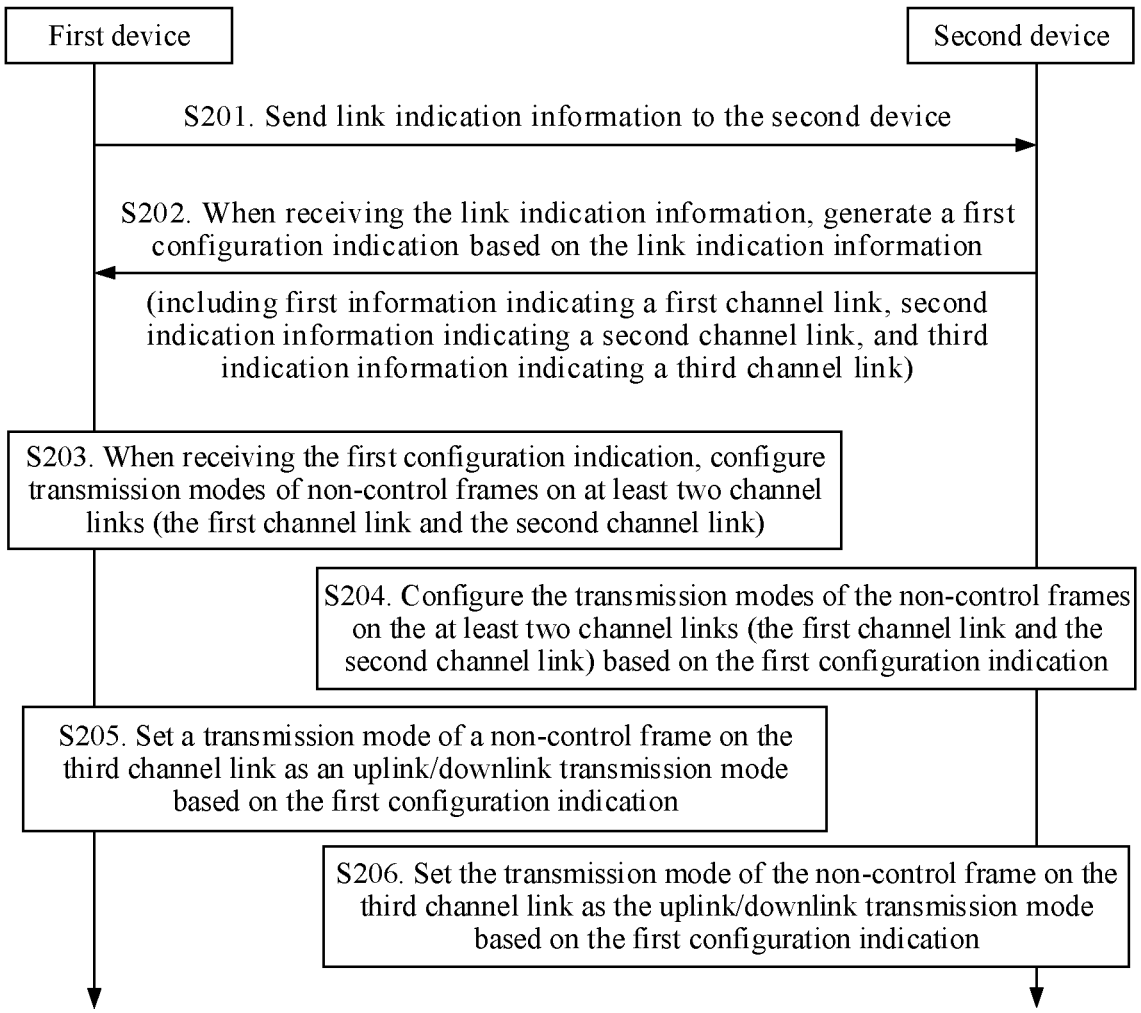
FIG. 5 is a schematic flowchart of a WI-FI communication method according to an embodiment of this application.

The following uses an example in which the first configuration indication further includes the third information used to indicate the third channel link for description. As shown in FIG. 5, the method may further include S205 and S206. S205 and S206, and S202 to S204 may be performed in any sequence. In FIG. 5, an example in which S205 and S206 are after S202 to S204 is used for description.

S205. The first device sets the transmission mode of the non-control frame on the third channel link as the uplink/downlink transmission mode based on the third information.

When the at least two channel links further include the third channel link, the link indication information sent by the first device to the second device may further include a link attribute of the third channel link. Therefore, after the second device receives the link indication information, the second device may further generate the first configuration indication used to indicate the transmission mode of the non-control frame on the third channel link based on attribute information of the third channel link in the link indication information. Herein, that the transmission mode that is of the non-control frame and that needs to be configured on the third channel link is the uplink/downlink transmission mode is used as an example. In this case, the first configuration indication further includes the third information used to indicate the third channel link. It should be noted that detailed descriptions of generating the third information by the second device are similar to the foregoing detailed descriptions of generating the first information and the second information. For details, refer to the foregoing related descriptions. Details are not described herein again in this embodiment of this application.

For example, the attribute information of the third channel link may be used to indicate that the transmission mode of the non-control frame on the third channel link is the uplink/downlink transmission mode. Therefore, when determining that the third channel link meets a service requirement, the second device generates the third information used to mark that the transmission mode of the non-control frame on the third channel link is the uplink/downlink transmission mode.

Further, when the first configuration indication received by the first device further includes the third information used to mark that the transmission mode of the non-control frame on the third channel link is the uplink/downlink transmission mode, the first device may set the transmission mode of the non-control frame on the third channel link as the uplink/downlink transmission mode. The uplink/downlink transmission mode means that a direction of the non-control frame transmitted on the third channel link may be uplink or downlink. For example, the third channel link not only may be used to transmit uplink data, but also may be used to transmit downlink data.

S206. The second device sets the transmission mode of the non-control frame on the third channel link as the uplink/downlink transmission mode. S205 and S206 may be performed in any sequence. In FIG. 5, an example in which S206 is after S205 is used for description.

Further, when the second device determines the third information used to mark that the transmission mode of the non-control frame on the third channel link is the uplink/downlink transmission mode, the second device may also set the transmission mode of the non-control frame on the third channel link as the uplink/downlink transmission mode. Further, after both the first device and the second device set the transmission mode of the non-control frame on the third channel link as the uplink/downlink transmission mode, the first device and the second device may perform data transmission on the third channel link. For example, if the first device is an AP and the second device is a STA, the AP may send downlink data on the third channel link, and the STA may also send uplink data on the third channel link.

Further, the second device may send a second configuration indication to the first device when the second device determines that a channel link is faulty, where the second configuration indication is used to indicate to replace the faulty channel link with the third channel link, and the third channel link is a channel link that is not faulty. The second device sets, based on the second configuration indication, the transmission mode of the non-control frame on the third channel link to be consistent with a transmission mode of a non-control frame on the faulty channel link. When the first device receives the second configuration indication, the first device also sets, based on the second configuration indication, the transmission mode of the non-control frame on the third channel link to be consistent with the transmission mode of the non-control frame on the faulty channel link.

For example, in a process in which the first device and the second device perform data transmission on the first channel link and the second channel link, if the first channel link or the second channel link is faulty, the first device and the second device may recover data transmission by configuring the third channel link. Further, when the first channel link is faulty, the second device may send, to the first device, the second configuration indication used to indicate to replace the faulty first channel link with the third channel link. In addition, the second device may further set the transmission mode of the non-control frame on the third channel link as the uplink transmission mode based on the second configuration indication. When the first device receives the second configuration indication, the first device may also set the transmission mode of the non-control frame on the third channel link as the uplink transmission mode based on the second configuration indication, and further transmit an uplink non-control frame on the third channel link, for example, transmit uplink data on the third channel link. When the second channel link is faulty, the second device may send, to the first device, the second configuration indication used to indicate to replace the faulty second channel link with the third channel link. In addition, the second device may set the transmission mode of the non-control frame on the third channel link as the downlink transmission mode based on the second configuration indication. When the first device receives the second configuration indication, the first device may also set the transmission mode of the non-control frame on the third channel link as the downlink transmission mode based on the second configuration indication, and further transmit a downlink non-control frame on the third channel link, for example, transmit downlink data on the third channel link.

Further, the first access point and the second access point described above may be virtual access points. In other words, the first device is a physical access point, and the first access point and the second access point are two virtual access points of the physical access point. For example, the first device is the AP in the WI-FI system shown in FIG. 1A. Alternatively, the first access point and the second access point described above are physical access points. In other words, the first device includes a plurality of physical access points. For example, the first device includes the plurality of APs in the WI-FI system shown in FIG. 1B or FIG. 1C. Similarly, the first station and the second station described above may be virtual stations. In other words, the second device is a physical station, and the first station and the second station are two virtual stations of the physical station. For example, the second device is the STA in the WI-FI system shown in FIG. 1A or FIG. 1B. Alternatively, the first station and the second station described above are physical stations. In other words, the first device includes a plurality of physical stations. For example, the second device includes the STA1 and the STA2 in the WI-FI system shown in FIG. 1C.

When the first device includes a plurality of APs, the WI-FI system further includes an AP controller. Correspondingly, when the first device receives, on the first channel link, uplink data sent by the second device, the first device may further send the uplink data to the AP controller, and the AP controller completes routing and forwarding of the uplink data. When the first device sends downlink data to the second device on the second channel link, the AP controller may first send the downlink data to the first device, so that when receiving the downlink data, the first device sends the downlink data to the second device on the second channel link. For example, the first device receives, on the first channel link, uplink data sent by the second device, and sends the uplink data to the AP controller. The first device receives downlink data fed back by the AP controller in response to the uplink data, and sends the downlink data to the second device on the second channel link.

For ease of understanding, the following describes in detail the WI-FI communication method provided in the embodiments of this application by using the following several different scenarios. Descriptions are provided by using an example in which a non-control frame transmitted by using the WI-FI communication method includes a data frame, a channel link that may be used to transmit uplink data is referred to as an uplink data link, a channel link that may be used to transmit downlink data is referred to as a downlink data link, and a channel link that may be used to transmit uplink data and downlink data is referred to as an uplink/downlink data link.

Scenario 1: The first device is an AP and includes a VAP1 and a VAP2, the second device is a STA and includes a VSTA1 and a VSTA2, the VAP1 and the VSTA1 correspond to a first channel link, and the VAP2 and the VSTA2 correspond to a second channel link. The scenario 1 may be the WI-FI communication scenario provided in FIG. 1A, and the at least two channel links include the first channel link and the second channel link.

Figure 6:
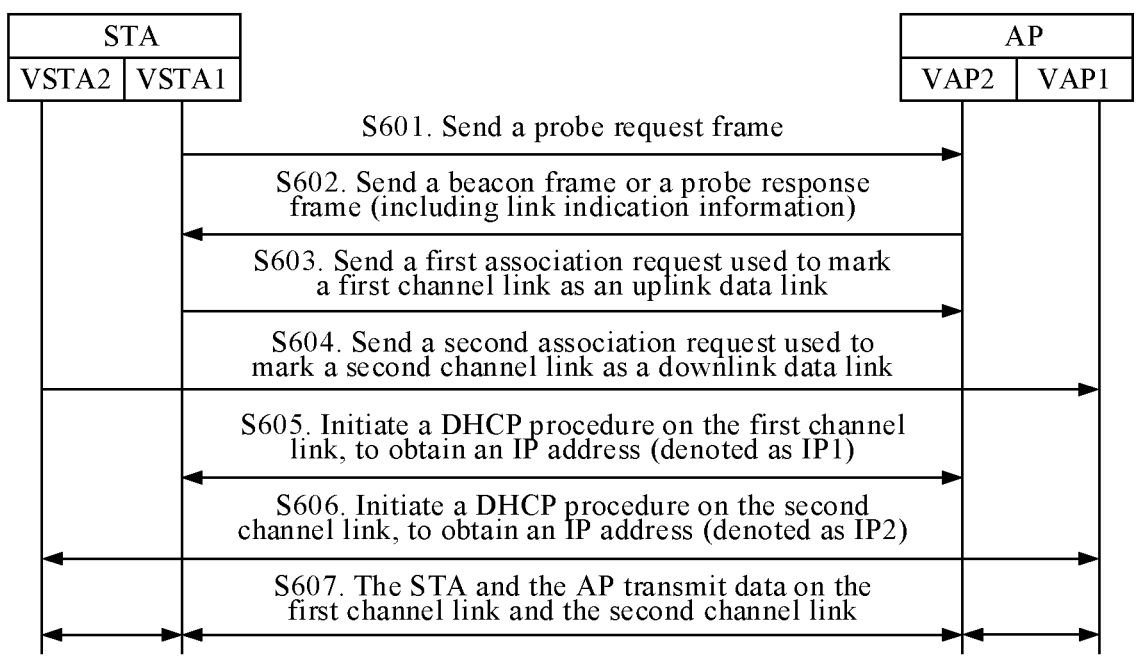
FIG. 6 is a schematic flowchart of a WI-FI communication method according to an embodiment of this application.

Further, referring to FIG. 6, the method may include the following steps.

S601. The STA sends a probe request frame to the AP (where an example in which the STA1 sends the probe request frame to the AP1 is used in FIG. 6).

S602. The AP sends a beacon frame or a probe response frame to the STA (where an example in which the AP1 sends the beacon frame or the probe response frame to the STA1 is used in FIG. 6). The beacon frame or the probe response frame includes link indication information, that is, the AP broadcasts an MFDD capability, an MFDD channel list, and the like by using the beacon frame or the probe response frame, so that the STA can obtain the beacon frame or the probe response frame through scanning, and parse the beacon frame or the probe response frame to obtain the link indication information.

S603. The STA sends, to the AP based on the link indication information, a first association request used to mark the first channel link as an uplink data link, and completes negotiation by using a first key, where the first key is used to encrypt or decrypt data on the first channel link (where optionally, the AP sends a first association response to the STA on the first channel link).

S604. The STA sends, to the AP based on the link indication information, a second association request used to mark the second channel link as a downlink data link, and completes negotiation by using a second key, where the second key is used to encrypt or decrypt data on the second channel link (where optionally, the AP sends a second association response to the STA on the second channel link).

S605. The STA and the AP initiate a Dynamic Host Configuration Protocol (DHCP) procedure on the first channel link, to obtain an Internet Protocol (IP) address (denoted as IP1) of the VSTA1. S606. The STA and the AP initiate a DHCP procedure on the second channel link, to obtain an IP address (denoted as IP2) of the VSTA2.

S607. The STA and the AP transmit data on the first channel link and the second channel link.

Figure 7:
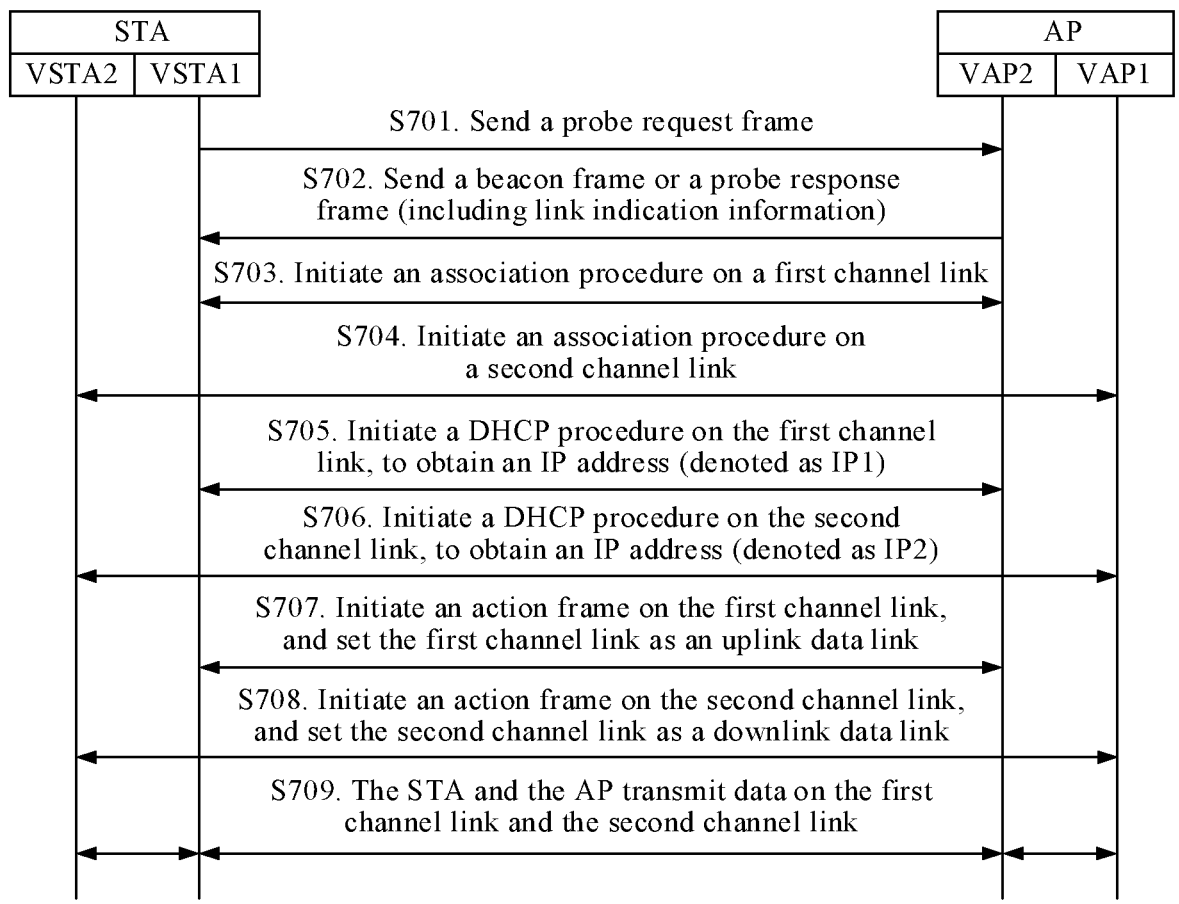
FIG. 7 is a schematic flowchart of a WI-FI communication method according to an embodiment of this application.

Alternatively, referring to FIG. 7, the method may include the following steps.

S701. The STA sends a probe request frame to the AP (where an example in which the VSTA1 sends the probe request frame to the VAP1 is used in FIG. 7).

S702. The AP sends a beacon frame or a probe response frame to the STA (where an example in which the VAP1 sends the beacon frame or the probe response frame to the VSTA1 is used in FIG. 7). The beacon frame or the probe response frame includes link indication information, that is, the AP broadcasts an MFDD capability, an MFDD channel list, and the like by using the beacon frame or the probe response frame, so that the STA can obtain the beacon frame or the probe response frame through scanning, and parse the beacon frame or the probe response frame to obtain the link indication information.

S703. The STA and the AP initiate an association procedure on the first channel link, and complete negotiation by using a first key, where the first key is used to encrypt or decrypt data on the first channel link.

S704. The STA and the AP initiate an association procedure on the second channel link, and complete negotiation by using a second key, where the second key is used to encrypt or decrypt data on the second channel link.

S705. The STA and the AP initiate a DHCP procedure on the first channel link, to obtain an IP address (denoted as IP1) of the VSTA1.

S706. The STA and the AP initiate a DHCP procedure on the second channel link, to obtain an IP address (denoted as IP2) of the VSTA2.

S707. The STA and the AP initiate an action frame (which may carry a link attribute of the first channel link) on the first channel link, to mark the first channel link as an uplink data link, and set the first channel link as an uplink data link.

S708. The STA and the AP initiate an action frame (which may carry a link attribute of the second channel link) on the second channel link, to mark the second channel link as a downlink data link, and set the second channel link as a downlink data link.

S709. The STA and the AP transmit data on the first channel link and the second channel link.

It should be noted that the processes shown in FIG. 6 and FIG. 7 are merely examples, and do not constitute a limitation in the embodiments of this application. FIG. 6 is described by using an example in which S601 and S602 are a scanning process, S603 and S604 are an association process, S605 and S606 are an IP address obtaining process, S607 is a service process, and the steps of marking the first channel link as the uplink data link and marking the second channel link as the downlink data link are performed in the association process. FIG. 7 is described by using an example in which S701 and S702 are a scanning process, S703 to S706 are an association process and an IP address obtaining process, S707 and S708 are a service process, and the steps of marking the first channel link as the uplink data link and marking the second channel link as the downlink data link are performed in the service process.

Scenario 2: The first device is an AP and includes a VAP1, a VAP2, and a VAP3, the second device is a STA and includes a VSTA1, a VSTA2, and a VSTA3, the VAP1 and the VSTA1 correspond to a first channel link, the VAP2 and the VSTA2 correspond to a second channel link, and the VAP3 and the VSTA3 correspond to a third channel link. The scenario 2 may be the WI-FI communication scenario provided in FIG. 1A, and the at least two channel links include the first channel link, the second channel link, and the third channel link.

Figure 8:
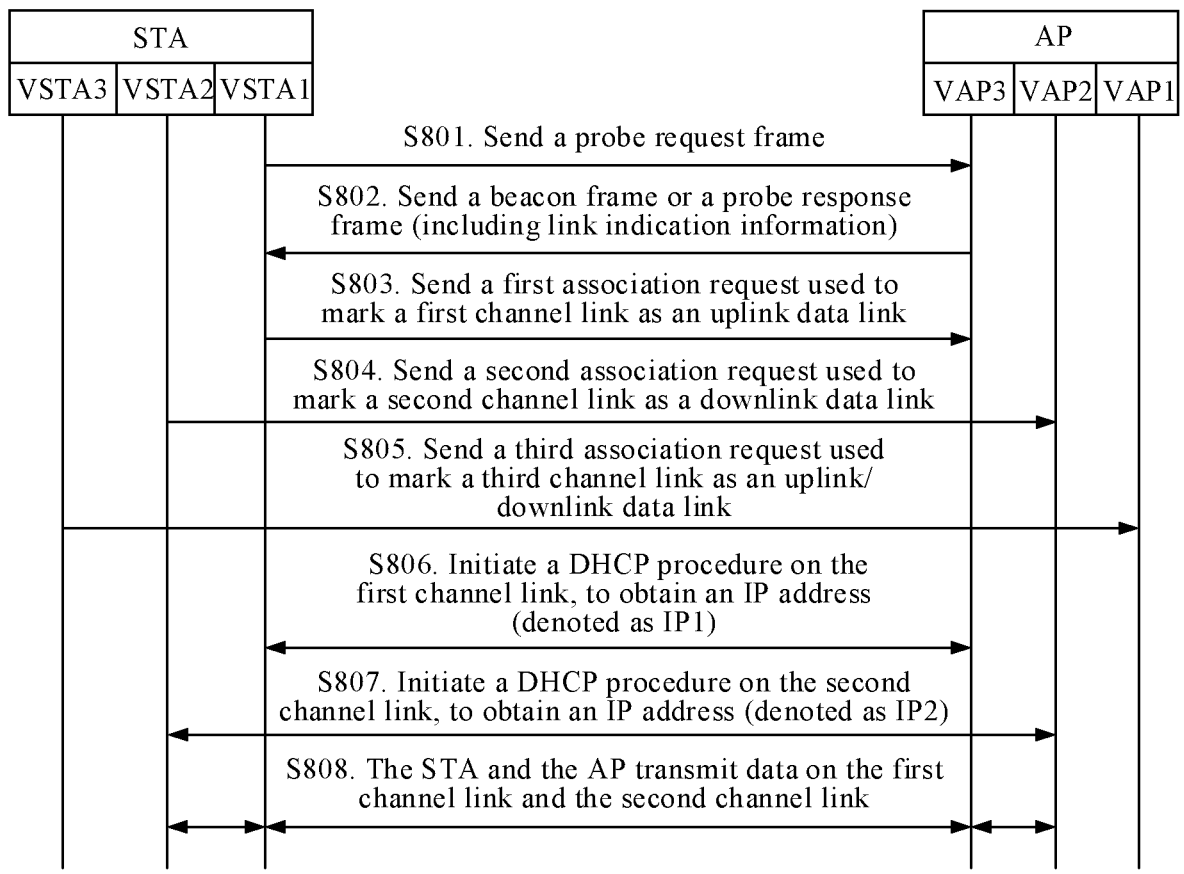
FIG. 8 is a schematic flowchart of a WI-FI communication method according to an embodiment of this application.

Further, referring to FIG. 8, the method may include the following steps. S801 to S804 are consistent with S601 to S604.

S805. The STA sends, to the AP based on the link indication information, a third association request used to mark the third channel link as an uplink/downlink data link, and completes negotiation by using a third key, where the third key is used to encrypt or decrypt data on the third channel link. S806 to S808 are consistent with S605 to S607. Optionally, when the first channel link and the second channel link are faulty, the AP and the STA may replace the faulty channel links with the third channel link. For example, when the first channel link is faulty, the third channel link may be re-marked as the uplink data link. When the second channel link is faulty, the third channel link may be re-marked as the downlink data link.

Figure 9:
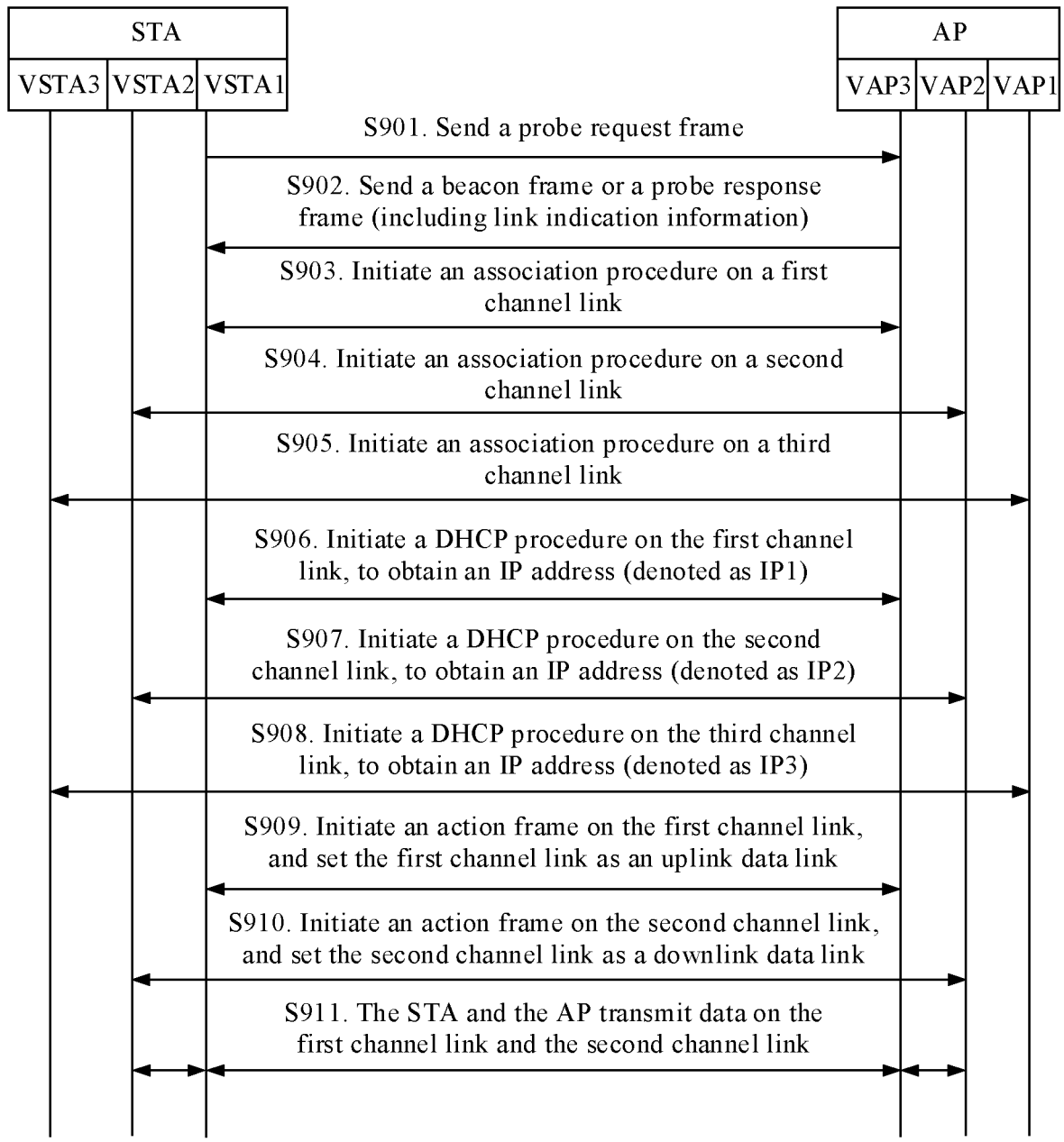
FIG. 9 is a schematic flowchart of a WI-FI communication method according to an embodiment of this application.

Alternatively, referring to FIG. 9, the method may include the following steps.

S901 to S904 are consistent with S701 to S704. S905. The STA and the AP initiate an association procedure on the third channel link, and complete negotiation by using a third key, where the third key is used to encrypt or decrypt data on the third channel link. S906 and S907 are consistent with S705 and S706.

S908. The STA and the AP initiate a DHCP procedure on the third channel link, to obtain an IP address (denoted as IP3) of the VSTA3. S909 to S911 are consistent with S707 to S709. Optionally, when the first channel link and the second channel link are faulty, the AP and the STA may replace the faulty channel links with the third channel link. For example, when the first channel link is faulty, the third channel link may be re-marked as the uplink data link. When the second channel link is faulty, the third channel link may be re-marked as the downlink data link.

Scenario 3: The first device is an AP and includes an AP1 and an AP2, the AP1 and the AP2 are controlled by an AP controller, the second device is a STA and includes a VSTA1 and a VSTA2, the AP1 and the VSTA1 correspond to a first channel link, and the AP2 and the VSTA2 correspond to a second channel link. The scenario 3 may be the WI-FI communication scenario provided in FIG. 1B.

Figure 10:
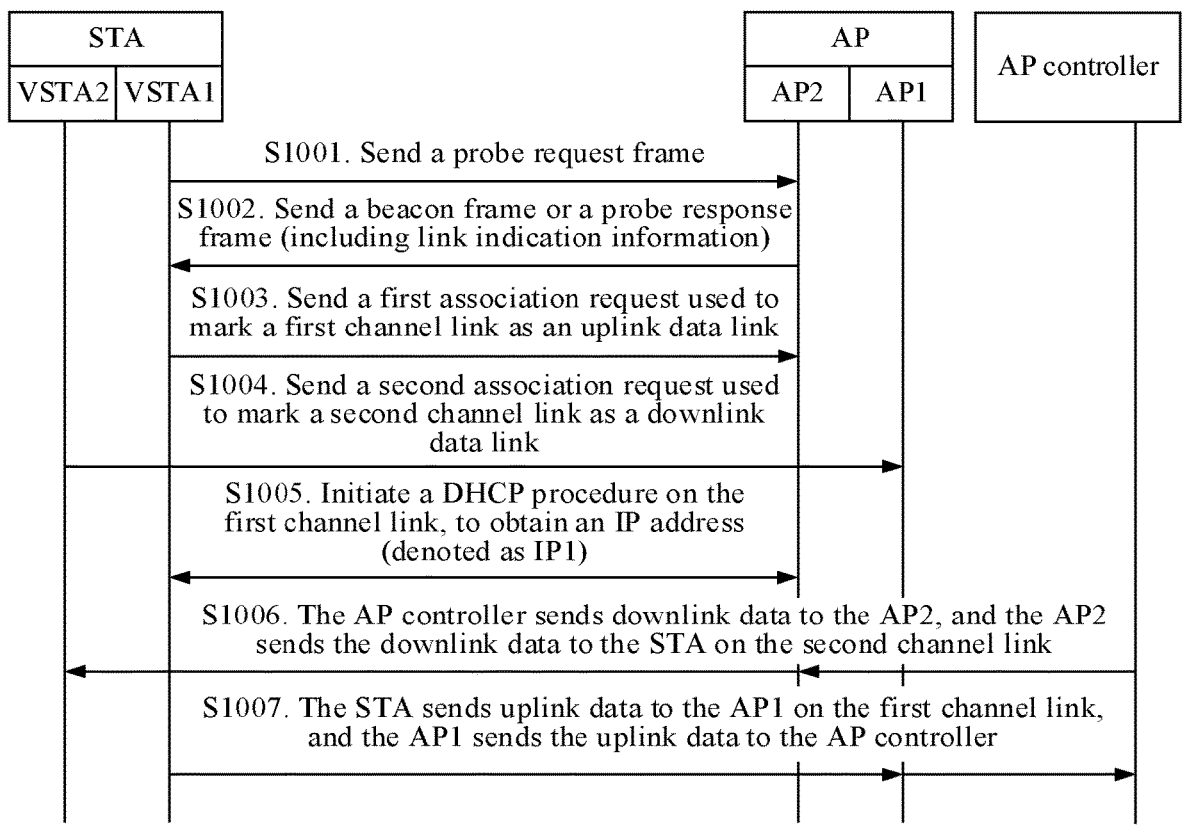
FIG. 10 is a schematic flowchart of a WI-FI communication method according to an embodiment of this application.

Further, referring to FIG. 10, the method may include the following steps. S1001 to S1004 are consistent with S601 to S604. S1005. The STA and the AP1 initiate a DHCP procedure on the first channel link, to obtain an IP address (denoted as IP1) of the VSTA1.

S1006. The AP controller sends downlink data of the STA to the AP2, when the AP2 receives the downlink data, the AP2 sends the downlink data to the STA on the second channel link.

S1007. The STA sends uplink data to the AP1 on the first channel link, when receiving the uplink data, the AP1 sends the uplink data to the AP controller, the AP controller completes routing and forwarding of the uplink data.

Figure 11:
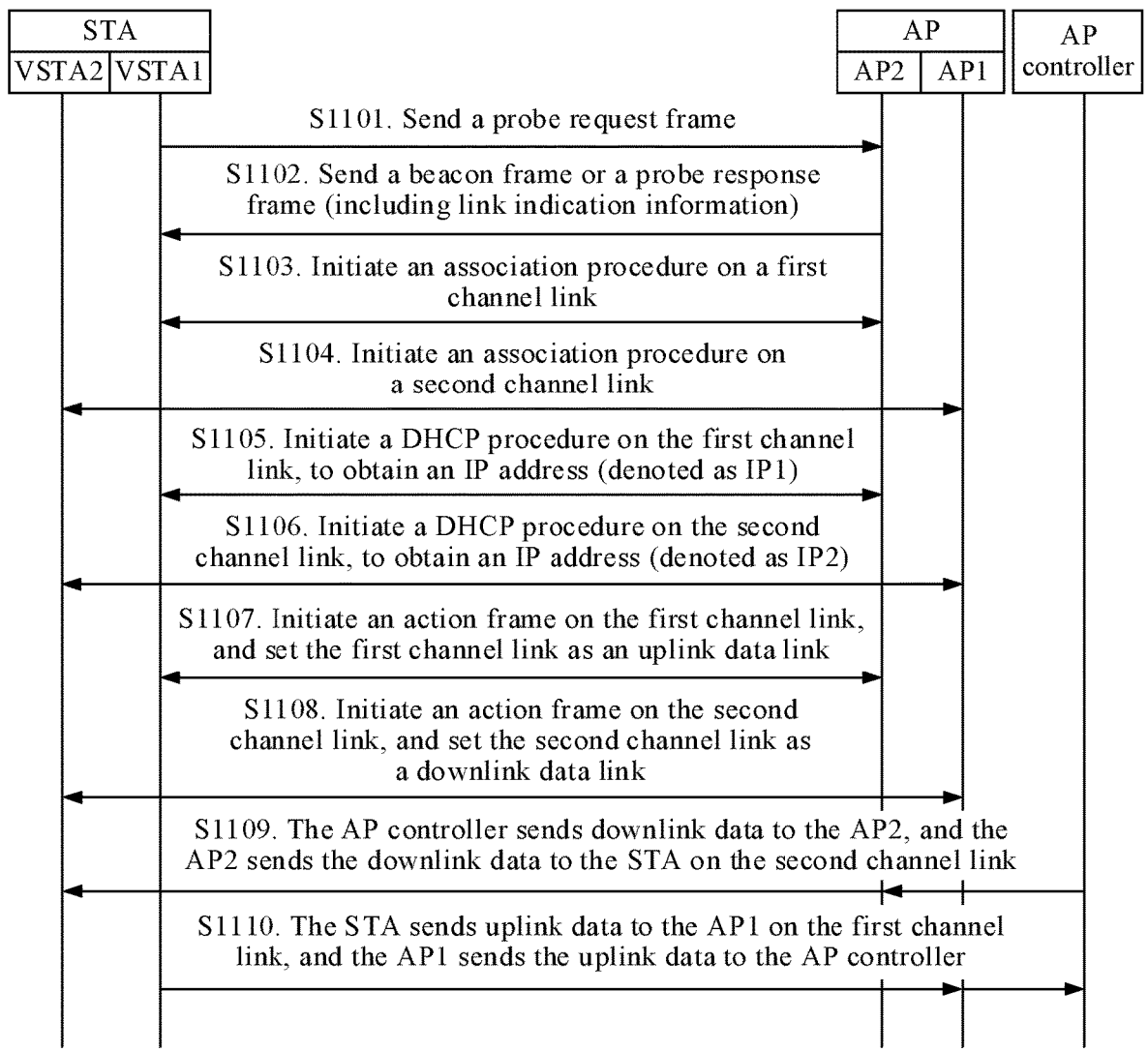
FIG. 11 is a schematic flowchart of a WI-FI communication method according to an embodiment of this application.

Alternatively, referring to FIG. 11, the method may include the following steps. S1101 to S1104 are consistent with S701 to S704. S1105. The STA and the AP1 initiate a DHCP procedure on the first channel link, to obtain an IP address (denoted as IP1) of the VSTA1.

S1106. The STA and the AP2 initiate a DHCP procedure on the second channel link, to obtain an IP address (denoted as IP2) of the VSTA2.

S1107. The STA and the AP1 initiate an action frame (which may carry a link attribute of the first channel link) on the first channel link, to mark the first channel link as an uplink data link, and set the first channel link as an uplink data link.

S1108. The STA and the AP2 initiate an action frame (which may carry a link attribute of the second channel link) on the second channel link, to mark the second channel link as a downlink data link, and set the second channel link as a downlink data link. S1109 and S1110 are consistent with S1006 and S1007.

Scenario 4: The first device is an AP and includes an AP1 and an AP2, the AP1 and the AP2 are controlled by an AP controller, the second device is a STA and includes a STA1 and a STA2, the STA1 includes a VSTA1 and a VSTA2, the STA2 includes a VSTA3 and a VSTA4, the AP1 and the VSTA1 correspond to a first channel link, the AP2 and the VSTA2 correspond to a second channel link, the AP1 and the VSTA3 correspond to a third channel link, and the AP2 and the VSTA4 correspond to a fourth channel link. The scenario 4 may be the WI-FI communication scenario provided in FIG. 1C.

A process in which the AP1 and the AP2 interact with the STA1 is similar to a process in which the AP1 and the AP2 interact with the STA2 in the scenario 4. In addition, a process in which the AP1 and the AP2 interact with the VSTA1 and the VSTA2 of the STA1 is similar to the interaction process in the scenario 3. For details, refer to the detailed descriptions in the scenario 3. Details are not described herein again in the embodiments of this application.

In the embodiments of this application, when the first device communicates with the second device on the at least two configurable channel links, the first device and the second device may configure the transmission modes of the non-control frames on the at least two channel links based on link attributes of different channel links. Therefore, a problem that an air interface collision occurs on uplink and downlink data because the communicating parties preempt a channel link is avoided, and a data transmission delay is reduced. In addition, transmission capabilities of different channel links can be fully utilized, and channel link utilization can be improved.

The foregoing mainly describes the solutions provided in the embodiments of this application from a perspective of interaction between the network elements. It can be understood that, to implement the foregoing functions, the network elements, for example, the first device and the second device, include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In the embodiments of this application, the first device and the second device may be divided into function modules based on the foregoing method examples. For example, each function module may be obtained through division based on each corresponding function, or two or more functions may be integrated into one module. The integrated module may be implemented in a form of hardware, or may be implemented in a form of a software functional module. It should be noted that, in the embodiments of this application, the division into modules is an example, and is merely logical function division. In an actual implementation, another division manner may be used. An example in which each function module is obtained through division based on each corresponding function is used below for description.

Figure 12:
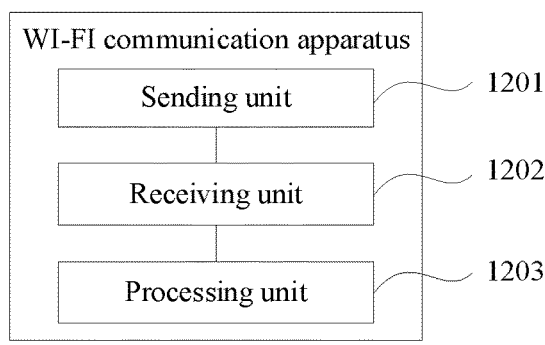
FIG. 12 is a schematic structural diagram of a WI-FI communication apparatus according to an embodiment of this application.

When an integrated unit is used, FIG. 12 is a possible schematic structural diagram of a WI-FI communication apparatus used in the foregoing embodiments. The WI-FI communication apparatus may be a first device or a chip built in the first device, and the WI-FI communication apparatus includes a sending unit 1201, a receiving unit 1202, and a processing unit 1203. The sending unit 1201 is configured to support the WI-FI communication apparatus in performing S201 in the foregoing method embodiment. The receiving unit 1202 is configured to support the WI-FI communication apparatus in receiving the first configuration indication sent in S202 in the foregoing method embodiment. The processing unit 1203 is configured to support the WI-FI communication apparatus in performing S203 and S205 in the foregoing method embodiment, and/or another process of the technology described in this specification.

Optionally, the first device is an AP, and the second device is a STA. Correspondingly, the sending unit 1201, the receiving unit 1202, and the processing unit 1203 in the WI-FI communication apparatus (that is, the AP or a chip built in the AP) may be further configured to perform the following steps Further, the sending unit 1201 may be configured to support the WI-FI communication apparatus in performing the sending actions (for example, the steps of sending the DHCP procedures to the STA on different channel links, and a step of sending downlink data on the second channel link) performed by the AP in S602 and S605 to S607 in the method embodiment shown in FIG. 6. The receiving unit 1202 may be configured to support the WI-FI communication apparatus in receiving the probe request frame sent in S601, receiving the first association request and the second association request sent in S603 and S604, and performing the reception actions (for example, the steps of receiving the DHCP procedures sent by the STA, and a step of receiving uplink data) performed by the AP in S605 to S607 in the method embodiment shown in FIG. 6. The processing unit 1203 may be configured to support the WI-FI communication apparatus in performing the processing action performed by the AP in the method embodiment shown in FIG. 6, for example, the steps of setting the first channel link as the uplink data link and setting the second channel link as the downlink data link. Alternatively, the sending unit 1201 may be configured to support the WI-FI communication apparatus in performing the sending actions (for example, the steps of sending the association procedures, the DHCP procedures, and the action frames on different channel links, and a step of sending downlink data on the second channel link) performed by the AP in S702 and S703 to S709 in the method embodiment shown in FIG. 7. The receiving unit 1202 may be configured to support the WI-FI communication apparatus in receiving the probe request frame sent in S701 and performing the reception actions (for example, the steps of receiving, on different channel links, the association procedures, the DHCP procedures, and the action frames sent by the STA, and a step of receiving uplink data) performed by the AP in S703 to S709 in the method embodiment shown in FIG. 7. The processing unit 1203 may be configured to support the WI-FI communication apparatus in performing the processing action performed by the AP in the method embodiment shown in FIG. 7, for example, the steps of setting the first channel link as the uplink data link and setting the second channel link as the downlink data link.

Alternatively, the sending unit 1201 may be configured to support the WI-FI communication apparatus in performing the sending actions (for example, the steps of sending the DHCP procedures on different channel links, and a step of sending downlink data on the second channel link) performed by the AP in S802 and S806 to S808 in the method embodiment shown in FIG. 8. The receiving unit 1202 may be configured to support the WI-FI communication apparatus in receiving the probe request frame sent in S801, receiving the first association request, the second association request, and the third association request sent in S803 to S805, and performing the reception actions (for example, the steps of receiving the DHCP procedures sent by the STA on different channel links, and a step of receiving uplink data) performed by the AP in S806 to S808 in the method embodiment shown in FIG. 8. The processing unit 1203 may be configured to support the WI-FI communication apparatus in performing the processing action performed by the AP in the method embodiment shown in FIG. 8, for example, the steps of setting the first channel link as the uplink data link and setting the second channel link as the downlink data link. Alternatively, the sending unit 1201 may be configured to support the WI-FI communication apparatus in performing the sending actions (for example, the steps of sending the association procedures, the DHCP procedures, and the action frames on different channel links, and a step of sending downlink data on the second channel link) performed by the AP in S902 and S903 to S911 in the method embodiment shown in FIG. 9. The receiving unit 1202 may be configured to support the WI-FI communication apparatus in receiving the probe request frame sent in S901 and performing the reception actions (for example, the steps of receiving, on different channel links, the association procedures, the DHCP procedures, and the action frames sent by the STA, and a step of receiving uplink data) performed by the AP in S903 to S911 in the method embodiment shown in FIG. 9. The processing unit 1203 may be configured to support the WI-FI communication apparatus in performing the processing action performed by the AP in the method embodiment shown in FIG. 9, for example, the steps of setting the first channel link as the uplink data link and setting the second channel link as the downlink data link.

Alternatively, the sending unit 1201 may be configured to support the WI-FI communication apparatus in performing the sending actions (for example, the step of sending the DHCP procedure on the first channel link) performed by the AP in S1002 and S1005, the step of sending the downlink data on the second channel link in S1006, and the step of sending the uplink data to the AP controller in S1007 in the method embodiment shown in FIG. 10. The receiving unit 1202 may be configured to support the WI-FI communication apparatus in receiving the probe request frame sent in S1001, receiving the first association request and the second association request sent in S1003 and S1004, and performing the step of receiving the DHCP procedure sent by the STA in S1005, the step of receiving the downlink data sent by the AP controller in S1006, and the step of receiving the uplink data in S1007 in the method embodiment shown in FIG. 10. The processing unit 1203 may be configured to support the WI-FI communication apparatus in performing the processing action performed by the AP in the method embodiment shown in FIG. 10, for example, the steps of setting the first channel link as the uplink data link and setting the second channel link as the downlink data link. Alternatively, the sending unit 1201 may be configured to support the WI-FI communication apparatus in performing the sending actions (for example, the steps of sending the association procedures, the DHCP procedures, and the action frames to the STA on different channel links) performed by the AP in S1102 and S1103 to S1108, and the steps of sending the downlink data on the second channel link in S1109 and sending the uplink data to the AP controller in S1110 in the method embodiment shown in FIG. 11. The receiving unit 1202 may be configured to support the WI-FI communication apparatus in receiving the probe request frame sent in S1101, performing the reception actions (for example, receiving, on different channel links, the association procedures, the DHCP procedures, and the action frames sent by the STA) performed by the AP in S1103 to S1108, receiving the downlink data sent by the AP controller in S1109, and receiving the uplink data on the first channel link in S1110 in the method embodiment shown in FIG. 11. The processing unit 1203 may be configured to support the WI-FI communication apparatus in performing the processing action performed by the AP in the method embodiment shown in FIG. 11, for example, the steps of setting the first channel link as the uplink data link and setting the second channel link as the downlink data link.

It should be noted that all related content of the steps in the foregoing method embodiments may be cited in function descriptions of corresponding function modules. Details are not described herein again.

Based on hardware implementation, the processing unit 1203 in this application may be a processor of the WI-FI communication apparatus, the sending unit 1201 may be a transmitter of the WI-FI communication apparatus, and the receiving unit 1202 may be a receiver of the WI-FI communication apparatus. The transmitter and the receiver may be usually integrated together to serve as a transceiver. Further, the transceiver may also be referred to as a radio frequency transceiver.

Figure 13:
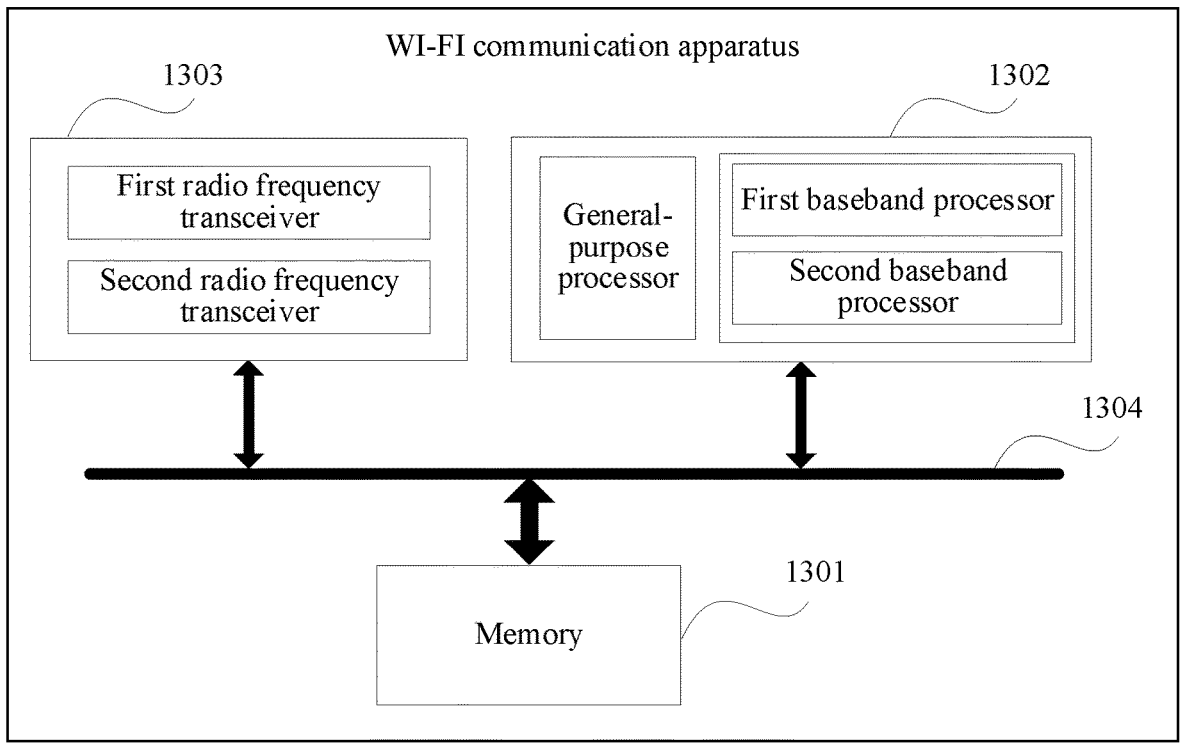
FIG. 13 is a schematic structural diagram of a WI-FI communication apparatus according to an embodiment of this application.

FIG. 13 is a schematic diagram of a possible logical structure of a WI-FI communication apparatus, used in the foregoing embodiments, according to an embodiment of this application. The WI-FI communication apparatus may be a first device or a chip built in the first device, and the WI-FI communication apparatus includes a processor 1302 and a radio frequency transceiver 1303. The processor 1302 is configured to control and manage an action of the WI-FI communication apparatus. For example, the processor 1302 is configured to support the WI-FI communication apparatus in performing the step of configuring the transmission modes of the non-control frames on the at least two channel links based on the first configuration indication in the foregoing method embodiments, and/or another process of the technology described in this specification. In addition, the WI-FI communication apparatus may further include a memory 1301 and a bus 1304, and the processor 1302, the radio frequency transceiver 1303, and the memory 1301 are connected to each other by using the bus 1304. There may be at least two radio frequency transceivers 1303, and the at least two radio frequency transceivers are configured to support the WI-FI communication apparatus in performing communication. For example, the at least two radio frequency transceivers may include a first radio frequency transceiver and a second radio frequency transceiver. The memory 1301 is configured to store program code and data of the WI-FI communication apparatus.

The processor 1302 may be a central processing unit, a general-purpose processor, a baseband processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination for implementing a computing function, for example, including one or more microprocessors or a combination of a digital signal processor and a microprocessor. For example, in FIG. 13, the processor 1302 includes a general-purpose processor, a first baseband processor, and a second baseband processor. An example in which each baseband processor includes a baseband (BB) module and a MAC module is used for description. The bus 1304 may be a Peripheral Component Interconnect (PCI) bus, an extended industry standard architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

Optionally, when the first device is an AP, the first radio frequency transceiver and the second radio frequency transceiver may be the RF in FIG. 1D, and the general-purpose processor may be the CPU in FIG. 1D. The first baseband processor and the second baseband processor may share the MAC controller in FIG. 1D. Each baseband processor may further include a MAC layer, a PHY layer, and a BB module. The MAC layer may correspond to the MAC layer in FIG. 1D. The BB module may correspond to the ABB in FIG. 1D.

Figure 14:
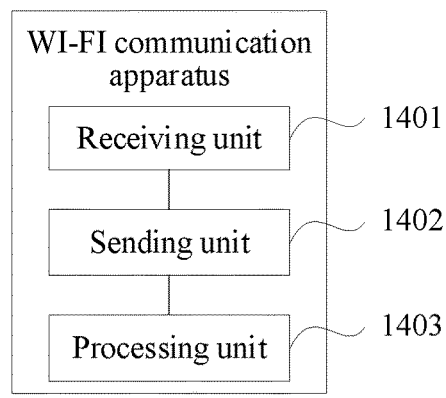
FIG. 14 is a schematic structural diagram of a WI-FI communication apparatus according to an embodiment of this application.

When an integrated unit is used, FIG. 14 is a possible schematic structural diagram of a WI-FI communication apparatus used in the foregoing embodiments. The WI-FI communication apparatus may be a second device or a chip built in the second device, and the WI-FI communication apparatus includes a receiving unit 1401, a sending unit 1402, and a processing unit 1403. The receiving unit 1401 is configured to support the WI-FI communication apparatus in performing the step of receiving the link indication information sent in S201 in the foregoing method embodiment. The sending unit 1402 is configured to support the WI-FI communication apparatus in performing S202 and S205 in the foregoing method embodiment. The processing unit 1403 is configured to support the WI-FI communication apparatus in performing the step of generating the first configuration indication in the foregoing method embodiment, S204, S206, and/or another process of the technology described in this specification.

Optionally, the first device is an AP, and the second device is a STA. Correspondingly, the receiving unit 1401, the sending unit 1402, and the processing unit 1403 in the WI-FI communication apparatus (that is, the STA or a chip built in the STA) may be further configured to perform the following steps.

The receiving unit 1401 may be configured to support the WI-FI communication apparatus in performing the step of receiving the beacon frame or the probe response frame sent in S602, and the reception actions (for example, the steps of receiving, on different channel links, the DHCP procedures sent by the AP, and a step of receiving downlink data on the second channel link) performed by the STA in S605 to S607 in the method embodiment shown in FIG. 6. The sending unit 1402 may be configured to support the WI-FI communication apparatus in performing the sending actions (for example, the steps of sending the DHCP procedures to the AP on different channel links, and a step of sending uplink data on the first channel link) performed by the STA in S601, S603, S604, and S605 to S607 in the method embodiment shown in FIG. 6. The processing unit 1403 may be configured to support the WI-FI communication apparatus in performing the processing action performed by the STA in the method embodiment shown in FIG. 6, for example, the steps of setting the first channel link as the uplink data link and setting the second channel link as the downlink data link. Alternatively, the receiving unit 1401 may be configured to support the WI-FI communication apparatus in performing the step of receiving the beacon frame or the probe response frame sent in S702, and the reception actions (for example, the steps of receiving the DHCP procedures and the action frames sent by the AP on different channel links, and a step of receiving downlink data on the second channel link) performed by the STA in S703 to S709 in the method embodiment shown in FIG. 7. The sending unit 1402 may be configured to support the WI-FI communication apparatus in performing S701, and the sending actions (for example, the steps of sending the DHCP procedures and the action frames to the AP on different channel links, and a step of sending uplink data on the first channel link) performed by the STA in S703 to S709 in the method embodiment shown in FIG. 7. The processing unit 1403 may be configured to support the WI-FI communication apparatus in performing the processing action performed by the STA in the method embodiment shown in FIG. 7, for example, the steps of setting the first channel link as the uplink data link and setting the second channel link as the downlink data link.

Alternatively, the receiving unit 1401 may be configured to support the WI-FI communication apparatus in performing the step of receiving the beacon frame or the probe response frame sent in S802, and the reception actions (for example, receiving downlink data, IP1, IP2, or the like sent by the AP) performed by the STA in S806 to S808 in the method embodiment shown in FIG. 8. The sending unit 1402 may be configured to support the WI-FI communication apparatus in performing the sending actions (for example, sending uplink data or the DHCP procedures to the AP) performed by the STA in S801, S803 to S805, and S806 to S808 in the method embodiment shown in FIG. 8. The processing unit 1403 may be configured to support the WI-FI communication apparatus in performing the processing action performed by the STA in the method embodiment shown in FIG. 8, for example, the steps of setting the first channel link as the uplink data link and setting the second channel link as the downlink data link. Alternatively, the sending unit 1402 may be configured to support the WI-FI communication apparatus in performing S901, and the sending actions (for example, the steps of initiating the association procedures, the DHCP procedures, and the action frames to the AP on different channel links, and a step of sending uplink data on the first channel link) performed by the STA in S903 to S911 in the method embodiment shown in FIG. 9. The receiving unit 1401 may be configured to support the WI-FI communication apparatus in receiving the beacon frame or the probe response frame sent in S902, and performing the reception actions (for example, the steps of receiving, on different channel links, the association procedures, the DHCP procedures, and the action frames sent by the AP, and a step of receiving downlink data sent on the second channel link) performed by the STA in S903 to S911 in the method embodiment shown in FIG. 9. The processing unit 1403 may be configured to support the WI-FI communication apparatus in performing the processing action performed by the AP in the method embodiment shown in FIG. 9, for example, the steps of setting the first channel link as the uplink data link and setting the second channel link as the downlink data link.

Alternatively, the receiving unit 1401 may be configured to support the WI-FI communication apparatus in receiving the beacon frame or the probe response frame sent in S1002, and performing the reception action (for example, receiving the IP address sent by the AP) performed by the STA in S1005, and the step of the sending downlink data by the AP on the second channel link in S1006 in the method embodiment shown in FIG. 10. The sending unit 1402 may be configured to support the WI-FI communication apparatus in performing the sending actions (for example, initiating the DHCP procedure to the AP) performed by the STA in S1001, S1003 and S1004, S1005, and S1007 in the method embodiment shown in FIG. 10. The processing unit 1403 may be configured to support the WI-FI communication apparatus in performing the processing action performed by the STA in the method embodiment shown in FIG. 10, for example, the steps of setting the first channel link as the uplink data link and setting the second channel link as the downlink data link. Alternatively, the receiving unit 1401 may be configured to support the WI-FI communication apparatus in performing the step of receiving the beacon frame or the probe response frame sent in S1102, and the reception actions (for example, receiving the association procedures, the DHCP procedures, and the action frames sent by an AP on different channel links) performed by the STA in S1103 to S1108, and receiving downlink data on the second channel link in the method embodiment shown in FIG. 11. The sending unit 1402 may be configured to support the WI-FI communication apparatus in performing the sending actions (for example, sending the association procedures, the DHCP procedures, and the action frames to the AP on different channel links) performed by the STA in S1101 and S1103 to S1108, and the step of sending uplink data on the first channel link in S1110 in the method embodiment shown in FIG. 11. The processing unit 1403 may be configured to support the WI-FI communication apparatus in performing the processing action performed by the STA in the method embodiment shown in FIG. 11, for example, the steps of setting the first channel link as the uplink data link and setting the second channel link as the downlink data link.

It should be noted that all related content of the steps in the foregoing method embodiments may be cited in function descriptions of corresponding function modules. Details are not described herein again.

Based on hardware implementation, the processing unit 1403 in this application may be a processor of the WI-FI communication apparatus, the receiving unit 1401 may be a receiver of the WI-FI communication apparatus, and the sending unit 1402 may be a transmitter of the WI-FI communication apparatus. The transmitter and the receiver may be usually integrated together to serve as a transceiver. The transceiver may also be a radio frequency transceiver.

Figure 15:
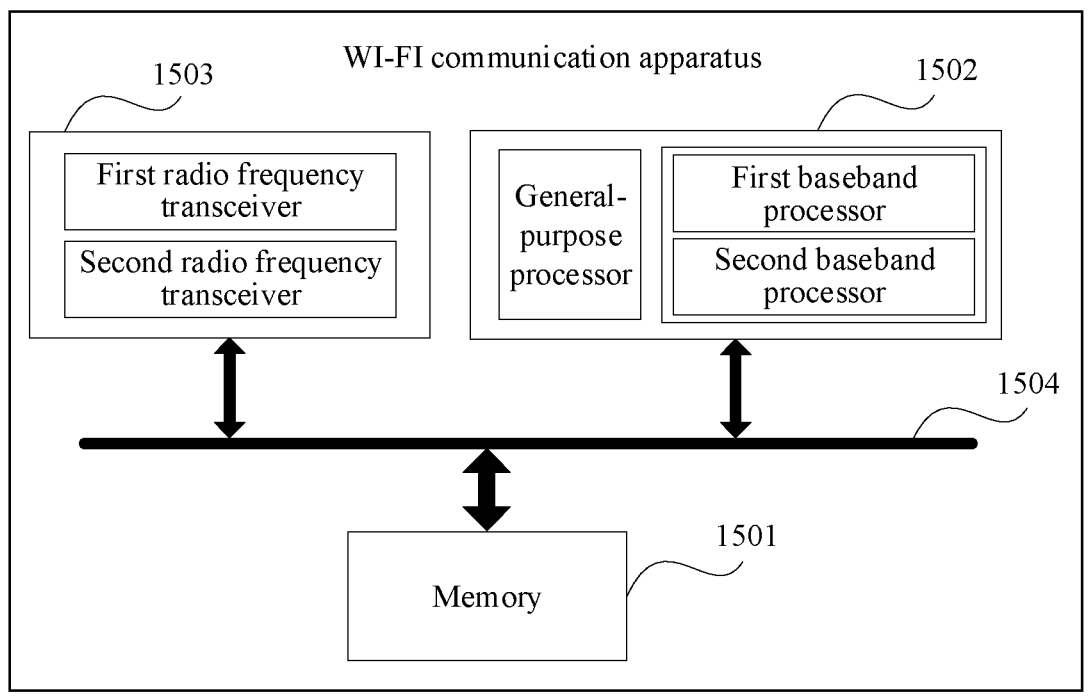
FIG. 15 is a schematic structural diagram of a WI-FI communication apparatus according to an embodiment of this application.

FIG. 15 is a schematic diagram of a possible logical structure of a WI-FI communication apparatus, used in the foregoing embodiments, according to an embodiment of this application. The WI-FI communication apparatus may be a second device or a chip built in the second device, and the WI-FI communication apparatus includes a processor 1502 and a radio frequency transceiver 1503. The processor 1502 is configured to control and manage an action of the WI-FI communication apparatus. For example, the processor 1502 is configured to support the WI-FI communication apparatus in performing the steps of generating the first configuration indication and configuring the transmission modes of the non-control frames on the at least two channel links based on the first configuration indication in the foregoing method embodiments, and/or another process of the technology described in this specification. In addition, the WI-FI communication apparatus further includes a memory 1501 and a bus 1504, and the processor 1502, the radio frequency transceiver 1503, and the memory 1501 are connected to each other by using the bus 1504. There may be at least two radio frequency transceivers 1503, and the at least two radio frequency transceivers are configured to support the WI-FI communication apparatus in performing communication. For example, the at least two radio frequency transceivers include a first radio frequency transceiver and a second radio frequency transceiver. The memory 1501 is configured to store program code and data of the WI-FI communication apparatus.

The processor 1502 may be a central processing unit, a general-purpose processor, a baseband processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination for implementing a computing function, for example, including one or more microprocessors or a combination of a digital signal processor and a microprocessor. For example, in FIG. 15, the processor 1502 includes a general-purpose processor, a first baseband processor, and a second baseband processor. An example in which each baseband processor includes a BB module and a MAC module is used for description. The bus 1504 may be a PCI bus, an EISA bus, or the like. The bus may be classified into an address bus, a data bus, a control bus, and the like. For ease of representation, only one thick line is used to represent the bus in FIG. 15, but this does not mean that there is only one bus or only one type of bus.

Figure 1E:
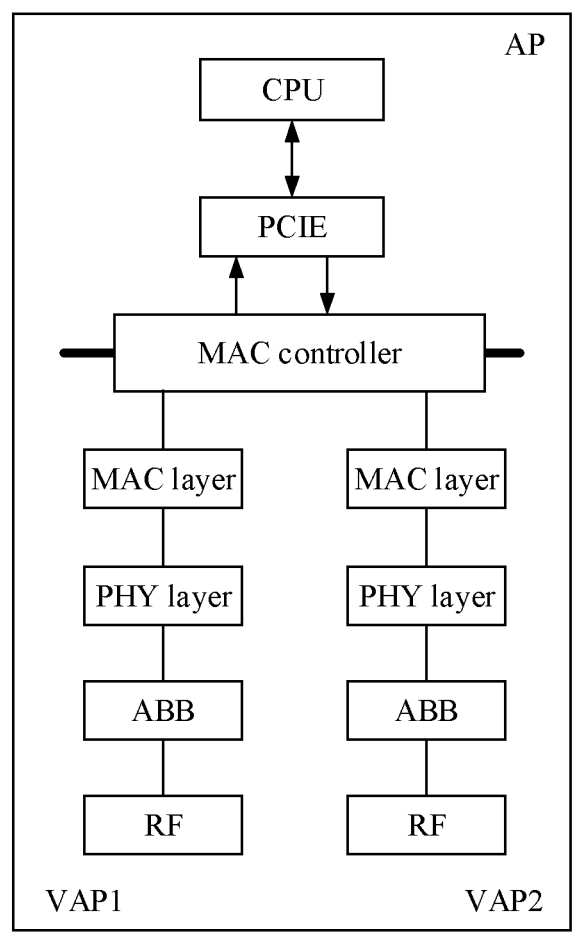
FIG. 1E is a schematic structural diagram of an AP according to an embodiment of this application.
Figure 1F:
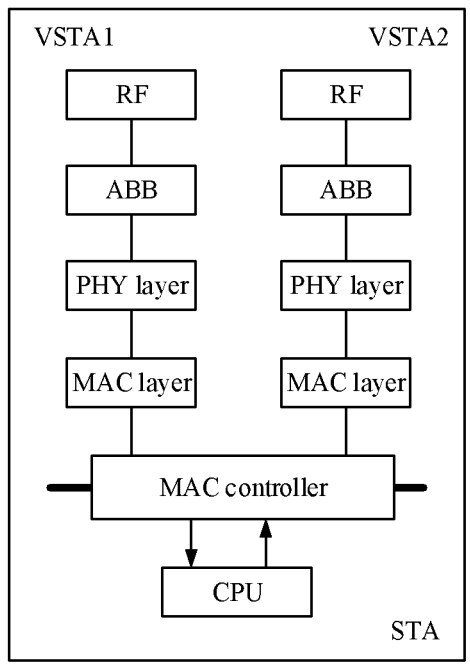
FIG. 1F is a schematic structural diagram of a STA according to an embodiment of this application.

Optionally, when the second device is a STA, the first radio frequency transceiver and the second radio frequency transceiver may be the RF in FIG. 1E, and the general-purpose processor may be the CPU in FIG. 1E. The first baseband processor and the second baseband processor may share the MAC controller in FIG. 1E. Each baseband processor may further include a MAC layer, a PHY layer, and a BB module. The MAC layer may correspond to the MAC layer in FIG. 1E. The BB module may correspond to the ABB in FIG. 1E.

In another embodiment of this application, a communication system is further provided. The communication system includes a first device and a second device. The first device or a chip built in the first device is the WI-FI communication apparatus provided in FIG. 12 or FIG. 13, and is configured to perform the steps performed by the first device in the foregoing method embodiments, and/or the second device or a chip built in the second device is the WI-FI communication apparatus provided in FIG. 14 or FIG. 15, and is configured to perform the steps performed by the second device in the foregoing method embodiments.

In the embodiments of this application, when the first device communicates with the second device on the at least two configurable channel links, the first device and the second device may configure the transmission modes of the non-control frames on the at least two channel links based on link attributes of different channel links. Therefore, a problem that an air interface collision occurs on uplink and downlink data because the communicating parties preempt a channel link is avoided, and a data transmission delay is reduced. In addition, transmission capabilities of different channel links can be fully utilized, and channel link utilization can be improved.

In the several embodiments provided in this application, it should be understood that the disclosed apparatuses and methods may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the other approaches, or all or a part of the technical solutions may be implemented in a form of a software product.

In another embodiment of this application, a readable storage medium is further provided. The readable storage medium stores computer-executable instructions. When a device (which may be a single-chip microcomputer, a chip, or the like) or a processor performs the steps performed by the first device in the WI-FI communication method provided in the foregoing method embodiments, the computer-executable instructions in the readable storage medium are read. The foregoing readable storage medium may include any medium that can store program code, such as a Universal Serial Bus (USB) flash drive, a removable hard disk, a read-only memory (ROM), a random-access memory (RAM), a magnetic disk, or an optical disc.

In another embodiment of this application, a readable storage medium is further provided. The readable storage medium stores computer-executable instructions. When a device (which may be a single-chip microcomputer, a chip, or the like) or a processor performs the steps performed by the second device in the WI-FI communication method provided in the foregoing method embodiments, the computer-executable instructions in the readable storage medium are read. The foregoing readable storage medium may include any medium that can store program code, such as a USB flash drive, a removable hard disk, a ROM, a RAM, a magnetic disk, or an optical disc.

In another embodiment of this application, a computer program product is further provided. The computer program product includes computer-executable instructions. The computer-executable instructions are stored in a computer-readable storage medium. At least one processor of a device may read the computer-executable instructions from the computer-readable storage medium. The at least one processor executes the computer-executable instructions to enable the device to perform the steps performed by the first device in the WI-FI communication method provided in the foregoing method embodiments.

In another embodiment of this application, a computer program product is further provided. The computer program product includes computer-executable instructions. The computer-executable instructions are stored in a computer-readable storage medium. At least one processor of a device may read the computer-executable instructions from the computer-readable storage medium. The at least one processor executes the computer-executable instructions to enable the device to perform the steps performed by the second device in the WI-FI communication method provided in the foregoing method embodiments.

It should be finally noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A method implemented by a first device, of a Wi-Fi communication system, configured to communicate with a second device of the Wi-Fi communication system using at least two configurable channel links, wherein the at least two configurable channel links comprise a first channel link and a second channel link, and wherein the method comprises:

sending, to the second device, link indication information indicating link attributes of the at least two configurable channel links;

receiving, from the second device responsive to the link indication information, a first configuration indication;

configuring transmission modes of non-control frames on the at least two configurable channel links based on the first configuration indication, wherein the transmission modes comprise one of an uplink transmission mode, a downlink transmission mode, or an uplink/downlink transmission mode;

receiving, from the second device and when one of the first channel link or the second channel link is faulty, a second configuration indication, wherein the second configuration indication instructs the first device to replace the first channel link or the second channel link with a third channel link, wherein the third channel link is not faulty, and wherein the at least two configurable channel links further comprise the third channel link; and setting, based on the second configuration indication, a transmission mode of a non-control frame on the third channel link to be consistent with a transmission mode of a non-control frame on the first channel link or the second channel link.

2. The method of claim 1, further comprising sending, to the second device, the link indication information on any channel link in the at least two configurable channel links using a control frame, wherein the control frame comprises one of a beacon frame, a probe request frame, a probe response frame, an information frame, an association response frame, or an action frame.

3. The method of claim 1, wherein the link attributes comprise a number of links of the at least two configurable channel links.

4. The method of claim 3, wherein the link attributes comprise supplementary information of the at least two configurable channel links, wherein the supplementary information separately indicates transmission capabilities of the at least two configurable channel links, and wherein the supplementary information comprises at least one of a throughput, a delay, a throughput first, a delay first, a busy/idle ratio of a channel on which a channel link is located, a channel quality of service (QOS), a received signal strength indication (RSSI), a received signal-to-noise ratio (SNR), or a frame error rate (FER).

5. The method of claim 1, wherein the first configuration indication comprises first information indicating the first channel link for which a first transmission mode is to be configured as the uplink transmission mode.

6. The method of claim 5, wherein the first configuration indication comprises the first information and second information indicating the second channel link for which a second transmission mode is to be configured as the downlink transmission mode, and wherein the method further comprises:
receiving, on the first channel link, uplink data from the second device;
sending the uplink data to a controller of the Wi-Fi communication system;
receiving, from the controller responsive to the uplink data, downlink data; and
sending, on the second channel link, the downlink data to the second device.

7. The method of claim 1, wherein the third channel link is set for the uplink transmission mode when the first channel link is faulty, and wherein the third channel link is set for the downlink transmission mode when the second channel link is faulty.

8. A method implemented by a second device, of a Wi-Fi communication system, configured to communicate with a first device of the Wi-Fi communication system using at least two configurable channel links, wherein the at least two configurable channel links comprise a first channel link and a second channel link, and wherein the method comprises:
receiving, from the first device, link indication information indicating link attributes of the at least two configurable channel links;
generating, based on the link indication information, a first configuration indication for configuring transmission modes of non-control frames on the at least two configurable channel links, wherein the transmission modes comprise one of an uplink transmission mode, a downlink transmission mode, or an uplink/downlink transmission mode;
sending, to the first device, the first configuration indication; and
sending, to the first device, a second configuration indication when one of the first channel link or the second channel link is faulty,
wherein the second configuration indication instructs the first device to replace the first channel link or the second channel link with a third channel link,
wherein the third channel link is not faulty,
wherein the at least two configurable channel links further comprise the third channel link, and
wherein a transmission mode of a non-control frame on the third channel link to be consistent with a transmission mode of a non-control frame on the first channel link or the second channel link based on the second configuration indication.

9. The method of claim 8, wherein the link attributes an identifier of each of the at least two configurable channel links.

10. The method of claim 9, wherein the link attributes comprise supplementary information of the at least two configurable channel links, wherein the supplementary information separately indicates transmission capabilities of the at least two configurable channel links, and wherein the supplementary information comprises at least one of a throughput, a delay, a throughput first, a delay first, a busy/idle ratio of a channel on which a channel link is located, a channel quality of service (QOS), a received signal strength indication (RSSI), a received signal-to-noise ratio (SNR), or a frame error rate (FER).

11. The method of claim 8, further comprising:
generating the first configuration indication to match the link indication information responsive to the link attributes meet service requirements of services carried on the at least two configurable channel links; and
skipping responding to the link indication information responsive to the link attributes do not meet the service requirements.

12. The method of claim 8, wherein the first configuration indication comprises first information indicating the first channel link for which a first transmission mode is to be configured as the downlink transmission mode.

13. The method of claim 12, wherein the first configuration indication comprises the first information and second information indicating the second channel link for which a second transmission mode is to be configured as the uplink transmission mode, and wherein the method further comprises:

sending, to the first device on the first channel link, uplink data; and receiving, on the second channel link and from the first device responsive to the uplink data, downlink data.

14. The method of claim 8, wherein the third channel link is set for the uplink transmission mode when the first channel link is faulty, and wherein the third channel link is set for the downlink transmission mode when the second channel link is faulty.

15. The method of claim 8, further comprising receiving, from the first device, the link indication information on any channel link in the at least two configurable channel links using a control frame, wherein the control frame comprises one of a beacon frame, a probe request frame, a probe response frame, an information frame, an association response frame, or an action frame.

16. A first device, comprising:
a transceiver; and
a processor coupled to the transceiver and configured to:
separately establish, using the transceiver, at least two channel links to communicate with a second device, wherein the at least two channel links comprise a first channel link and a second channel link, wherein transmission modes of non-control frames on the at least two channel links are configurable, and wherein the transmission modes comprise one of an uplink transmission mode, a downlink transmission mode, or an uplink/downlink transmission mode;
send, via the transceiver to the second device, link indication information indicating link attributes of the at least two channel links;
receive, via the transceiver, a first configuration indication from the second device responsive to the link indication information;
configure the transmission modes based on the first configuration indication;
receive, via the transceiver, a second configuration indication from the second device when one of the first channel link or the second channel link is faulty, wherein the second configuration indication instructs the first device to replace the first channel link or the second channel link with a third channel link, wherein the third channel link is not faulty, and wherein the at least two channel links further comprise the third channel link; and
set, based on the second configuration indication, a transmission mode of a non-control frame on the third channel link to be consistent with a transmission mode of a non-control frame on the first channel link or the second channel link.

17. The first device of claim 16, wherein the first configuration indication comprises information indicating the third channel link for which the transmission mode is to be configured as the uplink/downlink transmission mode.

18. A second device, comprising:
a transceiver; and
a processor coupled to the transceiver and configured to:
separately establish, using the transceiver, at least two channel links to communicate with a first device, wherein the at least two channel links comprise a first channel link and a second channel link, wherein transmission modes of non-control frames on the at least two channel links are configurable, and wherein the transmission modes comprise one of an uplink transmission mode, a downlink transmission mode, or an uplink/downlink transmission mode;

receive, via the transceiver, link indication information from the first device, wherein the link indication information indicates link attributes of the at least two channel links;
generate, based on the link indication information, a first configuration indication configuring the transmission modes;
send, via the transceiver, the first configuration indication to the first device; and
send, via the transceiver to the first device, a second configuration indication when one of the first channel link or the second channel link is faulty, wherein the second configuration indication instructs the first device to replace the first channel link or the second channel link with a third channel link, wherein the third channel link is not faulty, wherein the at least two channel links further comprise the third channel link, and wherein a transmission mode of a non-control frame on the third channel link to be consistent with a transmission mode of a non-control frame on the first channel link or the second channel link based on the second configuration indication.

19. The second device of claim 18, wherein the link attributes comprise expected transmission modes of the non-control frames.

20. A Wi-Fi communication system, comprising:
a first device comprising:
a first transceiver; and
a first processor coupled to the first transceiver; and
a second device comprising:
a second transceiver; and
a second processor coupled to the second transceiver,
wherein the first processor is configured to cause the first device to:
separately establish, using the first transceiver, at least two channel links to communicate with the second device, wherein the at least two channel links comprise a first channel link and a second channel link, wherein transmission modes of non-control frames on the at least two channel links are configurable, and wherein the transmission modes comprise one of an uplink transmission mode, a downlink transmission mode, or an uplink/downlink transmission mode; and
send, via the first transceiver to the second device, link indication information indicating link attributes of the at least two channel links,
wherein the second processor is configured to cause the second device to:
separately establish, using the second transceiver, the at least two channel links to communicate with the first device;
receive, via the second transceiver, the link indication information from the first device;
generate, based on the link indication information, a first configuration indication configuring the transmission modes; and
send, via the second transceiver, the first configuration indication to the first device, wherein the first processor is further configured to cause the first device to:
receive, via the first transceiver, the first configuration indication from the second device responsive to the link indication information;
configure the transmission modes based on the first configuration indication;

receive, via the second transceiver, a second configuration indication from the second device when one of the first channel link or the second channel link is faulty, wherein the second configuration indication instructs the first device to replace the first channel link or the second channel link with a third channel link, wherein the third channel link is not faulty, and wherein the at least two channel links further comprise the third channel link; and set, based on the second configuration indication, a transmission mode of a non-control frame on the third channel link to be consistent with a transmission mode of a non-control frame on the first channel link or the second channel link.

\* \* \* \* \*